United States Patent
You et al.

(10) Patent No.: US 12,457,610 B2
(45) Date of Patent: Oct. 28, 2025

(54) COMMUNICATION METHOD INCLUDING A PHYSICAL UPLINK SHARED CHANNEL (PUSH) BASED ON A SYNCHRONIZATION SIGNAL BROADCAST BLOCK (SSB) AND APPARATUS

(71) Applicant: HUAWEI TECHNOLOGIES CO., LTD., Shenzhen (CN)

(72) Inventors: Chunhua You, Shanghai (CN); Xiaoying Xu, Shenzhen (CN); Qinghai Zeng, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 17/953,718

(22) Filed: Sep. 27, 2022

(65) Prior Publication Data
US 2023/0025552 A1  Jan. 26, 2023

Related U.S. Application Data

(63) Continuation of application No. PCT/CN2021/082166, filed on Mar. 22, 2021.

(30) Foreign Application Priority Data

Apr. 9, 2020 (CN) .......................... 202010275679.0

(51) Int. Cl.
H04W 72/21 (2023.01)
(52) U.S. Cl.
CPC .................................. H04W 72/21 (2023.01)
(58) Field of Classification Search
None
See application file for complete search history.

(56) References Cited

U.S. PATENT DOCUMENTS

| | | | | |
|---|---|---|---|---|
| 11,013,019 B2 * | 5/2021 | Malik | .................... | H04W 76/27 |
| 11,838,883 B2 * | 12/2023 | Li | .......................... | H04L 5/0055 |
| 12,052,762 B2 * | 7/2024 | Xiong | ................. | H04W 74/002 |
| 2020/0029345 A1 * | 1/2020 | Malik | ................... | H04L 27/364 |
| 2020/0100297 A1 * | 3/2020 | Agiwal | ............... | H04W 52/365 |
| 2020/0288506 A1 * | 9/2020 | Lei | .................... | H04W 74/0833 |

(Continued)

FOREIGN PATENT DOCUMENTS

| | | |
|---|---|---|
| CN | 109076364 A | 12/2018 |
| CN | 109076593 A | 12/2018 |

(Continued)

OTHER PUBLICATIONS

Vivo, Discussion on channel structure for 2-step RACH. 3GPP TSG RAN WG1 #97, Reno, USA, May 13 17, 2019, R1-1906124, 14 pages.

3GPP TS 38.212 V16.1.0 (Mar. 2020), 3rd Generation Partnership Project; Technical Specification Group Radio Access Network; NR; Multiplexing and channel coding(Release 16), 146 pages.

3GPP TS 38.213 V16.1.0 (Mar. 2020), 3rd Generation Partnership Project; Technical Specification Group Radio Access Network; NR; Physical layer procedures for control(Release 16), 156 pages.

(Continued)

*Primary Examiner* — Faiyazkhan Ghafoerkhan
(74) *Attorney, Agent, or Firm* — HAUPTMAN HAM, LLP

(57) ABSTRACT

A communication method and an apparatus includes a terminal device that receives a first SSB, determines a PUSCH occasion corresponding to the first SSB, and sends uplink information by using the PUSCH occasion corresponding to the first SSB; and further, the terminal device receives, based on a spatial reception parameter of the first SSB, downlink information sent by a network device.

15 Claims, 19 Drawing Sheets

(56) References Cited

U.S. PATENT DOCUMENTS

| | | | |
|---|---|---|---|
| 2021/0014900 A1* | 1/2021 | Lei | H04W 4/70 |
| 2021/0022180 A1* | 1/2021 | Lei | H04W 74/0838 |
| 2021/0105828 A1* | 4/2021 | Agiwal | H04B 17/327 |
| 2021/0168874 A1* | 6/2021 | Wei | H04W 72/23 |
| 2021/0219346 A1* | 7/2021 | Agiwal | H04W 56/001 |
| 2021/0266975 A1* | 8/2021 | Taherzadeh Boroujeni | H04W 74/0833 |
| 2021/0352697 A1* | 11/2021 | Irukulapati | H04W 56/00 |
| 2022/0210841 A1* | 6/2022 | Lin | H04W 72/0446 |
| 2022/0217789 A1* | 7/2022 | Lee | H04W 74/0816 |
| 2023/0010472 A1* | 1/2023 | Agiwal | H04W 56/001 |
| 2023/0025552 A1* | 1/2023 | You | H04L 5/005 |
| 2023/0069053 A1* | 3/2023 | Yuan | H04W 72/0446 |
| 2023/0247670 A1* | 8/2023 | Lee | H04W 76/28 370/329 |
| 2024/0129956 A1* | 4/2024 | Agiwal | H04W 74/0833 |
| 2024/0405837 A1* | 12/2024 | Ali | H04B 7/0639 |

FOREIGN PATENT DOCUMENTS

| | | | |
|---|---|---|---|
| CN | 110461007 A | 11/2019 | |
| CN | 110574418 A | 12/2019 | |
| WO | 2019137172 A1 | 7/2019 | |

OTHER PUBLICATIONS

3GPP TS 38.214 V16.1.0 (Mar. 2020), 3rd Generation Partnership Project; Technical Specification Group Radio Access Network; NR; Physical layer procedures for data(Release 16), 151 pages.

3GPP TS 38.321 V15.8.0 (Dec. 2019), 3rd Generation Partnership Project; Technical Specification Group Radio Access Network; NR; Medium Access Control (MAC) protocol specification(Release 15), 78 pages.

3GPP TS 38.331 V16.0.0 (Mar. 2020), 3rd Generation Partnership Project; Technical Specification Group Radio Access Network; NR; Radio Resource Control (RRC) protocol specification(Release 16), 834 pages.

3GPP TS 38.211 V16.1.0 (Mar. 2020), 3rd Generation Partnership Project; Technical Specification Group Radio Access Network; NR; Physical channels and modulation(Release 16), 130 pages.

India Office Action issued in corresponding India Application No. 202227056784, dated Dec. 12, 2022, pp. 1-6.

Ericsson, Channel Structure for Two-Step RACH. 3GPP TSG-RAN WG1 Meeting #98, Prague, CZ, Aug. 26-30, 2019, R1-1909122, 14 pages.

Extended European Search Report issued in corresponding European Application No. 21784469.5, dated Aug. 2, 2023, pp. 1-8.

* cited by examiner

COMMUNICATION METHOD INCLUDING A PHYSICAL UPLINK SHARED CHANNEL (PUSH) BASED ON A SYNCHRONIZATION SIGNAL BROADCAST BLOCK (SSB) AND APPARATUS

CROSS-REFERENCE TO RELATED APPLICATIONS

This application is a continuation of International Application No. PCT/CN2021/082166, filed on Mar. 22, 2021, which claims priority to Chinese Patent Application No. 202010275679.0, filed on Apr. 9, 2020. The disclosures of the aforementioned applications are herein incorporated in entirety by reference.

BACKGROUND

In a 5th generation (5G) communication system, a terminal device has three radio resource control (RRC) modes: an RRC connected (RRC-connected) mode, an RRC idle (RRC-idle) mode, and an RRC inactive (inactive) mode.

A terminal device in the connected mode performs data transmission with a network device. In response to a terminal device being in the idle mode or the inactive mode expects to transmit data, the terminal device needs to first complete a plurality of times of information exchange to enter the connected mode. In this manner, the terminal device in the idle mode or the inactive mode needs to enter the connected mode to perform data transmission with the network device. For a small data packet that is not transmitted frequently, unnecessary power consumption and signaling overheads are caused.

SUMMARY

Some embodiments provide a communication method and an apparatus, to implement uplink transmission performed by a terminal device in an idle mode or an inactive mode, to reduce power consumption and signaling overheads of uplink transmission.

Some embodiments provide a communication method. The method is applied to a terminal device, or is applied to a chip inside the terminal device. An example in which the method is applied to a terminal device is used. In this method, the terminal device receives a first SSB, determines a PUSCH occasion corresponding to the first SSB, and sends uplink information by using the PUSCH occasion.

In this manner, because there is a correspondence between the SSB and the PUSCH occasion, in a cell with a beam operation, the terminal device in an idle mode or an inactive mode sends the uplink information by using the PUSCH occasion corresponding to the SSB, and receive downlink information based on a spatial reception parameter of the SSB. In comparison with a manner of restoring an RRC connection for data transmission or performing data transmission in a random access procedure, power consumption and signaling overheads of uplink transmission is effectively reduced.

In some embodiments, the method further includes: receiving downlink information from a network device based on a spatial reception parameter of the first SSB.

In some embodiments, the method further includes: determining a correspondence between M SSBs and a plurality of PUSCH occasions, where the M SSBs include the first SSB, and M is a positive integer; and the determining a PUSCH occasion corresponding to the first SSB includes: determining, based on the correspondence between the M SSBs and the plurality of PUSCH occasions, the PUSCH occasion corresponding to the first SSB.

In some embodiments, the PUSCH occasion includes a frequency domain resource; and the determining a correspondence between M SSBs and a plurality of PUSCH occasions includes: determining the correspondence between the M SSBs and the plurality of PUSCH occasions based on indexes of frequency domain resources of the plurality of PUSCH occasions.

In some embodiments, the PUSCH occasion includes a time domain resource; and the determining a correspondence between M SSBs and a plurality of PUSCH occasions includes: determining the correspondence between the M SSBs and the plurality of PUSCH occasions based on indexes of slots in which the plurality of PUSCH occasions are located; or determining the correspondence between the M SSBs and the plurality of PUSCH occasions based on indexes of time domain resources of the plurality of PUSCH occasions and indexes of slots in which the plurality of PUSCH occasions are located.

In some embodiments, the PUSCH occasion is associated with a DMRS resource, and the DMRS resource includes DMRS port information and/or DMRS sequence information; and the determining a correspondence between M SSBs and a plurality of PUSCH occasions includes: determining the correspondence between the M SSBs and the plurality of PUSCH occasions further based on DMRS resources associated with the plurality of PUSCH occasions.

In some embodiments, the determining a correspondence between M SSBs and a plurality of PUSCH occasions includes: receiving first indication information from the network device, where the first indication information indicates the correspondence between the M SSBs and the plurality of PUSCH occasions.

In this manner, the network device indicates the correspondence between the plurality of SSBs and the plurality of PUSCH occasions to the terminal device. In comparison with a case in which the terminal device determines the correspondence between the plurality of SSBs and the plurality of PUSCH occasions, processing load of the terminal device is effectively reduced.

In some embodiments, the plurality of PUSCH transmission occasions are in a preset time period.

In some embodiments, a start position of the preset time period is a start position of a reference radio frame; and the method further includes: receiving second indication information from the network device, where the second indication information indicates the reference radio frame.

In some embodiments, the method further includes: receiving configuration information, where the configuration information is used to configure a plurality of PUSCH occasions.

In some embodiments, the method further includes: selecting, from the M SSBs based on measurement values of the M SSBs, a first SSB whose measurement value is greater than or equal to a preset threshold.

Some embodiments provide a communication method. The method is applied to a network device, or is applied to a chip inside the network device. An example in which the method is applied to the network device is used. In this method, the network device receives uplink information from a first PUSCH occasion, determines a first SSB corresponding to the first PUSCH occasion, and sends downlink information based on a spatial transmission parameter of the first SSB.

In this manner, in a cell with a beam operation, a correspondence between a plurality of SSBs and a plurality of PUSCH occasions is set, so that after receiving the uplink information on the PUSCH occasion, the network device determines the first SSB corresponding to the first PUSCH occasion, and further send the downlink information based on the spatial transmission parameter of the first SSB, thereby implementing information transmission between the network device and the terminal device in an idle mode or an inactive mode.

In some embodiments, the method further includes: determining a correspondence between M SSBs and a plurality of PUSCH occasions, where the plurality of PUSCH occasions include the first PUSCH occasion, and M is a positive integer; and the determining a first SSB corresponding to the first PUSCH occasion includes: determining, based on the correspondence between the M SSBs and the plurality of PUSCH occasions, the first SSB corresponding to the first PUSCH occasion.

In some embodiments, the PUSCH occasion includes a frequency domain resource; and the determining a correspondence between M SSBs and a plurality of PUSCH occasions includes: determining the correspondence between the M SSBs and the plurality of PUSCH occasions based on indexes of frequency domain resources of the plurality of PUSCH occasions.

In some embodiments, the PUSCH occasion includes a time domain resource; and the determining a correspondence between M SSBs and a plurality of PUSCH occasions includes: determining the correspondence between the M SSBs and the plurality of PUSCH occasions based on indexes of slots in which the plurality of PUSCH occasions are located; or determining the correspondence between the M SSBs and the plurality of PUSCH occasions based on indexes of time domain resources of the plurality of PUSCH occasions and indexes of slots in which the plurality of PUSCH occasions are located.

In some embodiments, the PUSCH occasion is associated with a DMRS resource, and the DMRS resource includes DMRS port information and/or DMRS sequence information; and the determining a correspondence between M SSBs and a plurality of PUSCH occasions includes: determining the correspondence between the M SSBs and the plurality of PUSCH occasions further based on DMRS resources associated with the plurality of PUSCH occasions.

In some embodiments, the method further includes: sending first indication information, where the first indication information indicates a correspondence between M SSBs and a plurality of PUSCH occasions, and the plurality of PUSCH occasions include the first PUSCH occasion; and the determining a first SSB corresponding to the first PUSCH occasion includes: determining, based on the correspondence between the M SSBs and the plurality of PUSCH occasions, the first SSB corresponding to the first PUSCH occasion.

In some embodiments, the plurality of PUSCH transmission occasions are in a preset time period.

In some embodiments, a start position of the preset time period is a start position of a reference radio frame; and the method further includes: sending second indication information, where the second indication information indicates the reference radio frame.

In some embodiments, the method further includes: sending configuration information, where the configuration information is used to configure a plurality of PUSCH occasions.

Some embodiments provide a communication method. The method is applied to a terminal device, or is applied to a chip inside the terminal device. An example in which the method is applied to a terminal device is used. In this method, the terminal device receives a first SSB, and in response to determining that a measurement value of the first SSB is less than or equal to a preset threshold, initiates random access to a network device by using a random access resource corresponding to a second SSB, and the random access succeeds; and the terminal device receives downlink information based on a spatial reception parameter of the second SSB.

In this manner, in a cell with a beam operation, a serving SSB is maintained between the terminal device and the network device, so that the terminal device in an idle mode or an inactive mode sends uplink information, and receive the downlink information based on a spatial reception parameter of the serving SSB. In comparison with a manner of restoring an RRC connection for data transmission or performing data transmission in a random-access procedure, power consumption and signaling overheads of uplink transmission is effectively reduced. Further, in response to a measurement value of the serving SSB being less than or equal to the preset threshold, the terminal device notifies, by using a random access procedure, the network device to switch the serving SSB, to effectively ensure normal communication between the terminal device and the network device based on the serving SSB, and reduce a problem of a communication failure caused due to a low measurement value of the serving SSB.

In some embodiments, the method further includes: receiving a random access response from the network device based on a spatial reception parameter of the second SSB.

In some embodiments, the method further includes: after determining that the measurement value of the first SSB is greater than or equal to the preset threshold, sending the uplink information to the network device.

In some embodiments, the method further includes: receiving the downlink information from the network device based on a spatial reception parameter of the first SSB.

Some embodiments provide a communication method. The method is applied to a network device, or is applied to a chip inside the network device. An example in which the method is applied to a network device is used. In this method, the network device receives a random access request by using a random access resource corresponding to a second SSB, where the random access request requests random access, and before the random access succeeds, a spatial transmission parameter of a first SSB is used by the network device to send downlink information to a terminal device; and after the random access succeeds, the network device sends the downlink information based on a spatial transmission parameter of a second SSB.

Some embodiments provide a communication apparatus. The communication apparatus is a terminal device or a chip disposed in a terminal device. The communication apparatus has a function of implementing the embodiments. For example, the communication apparatus includes a corresponding module, unit, or means (means) for performing steps in the embodiments. The function, unit or means are implemented by software, are implemented by hardware, or are implemented by hardware executing corresponding software.

In some embodiments, the communication apparatus includes a processing unit and a communication unit. The communication unit is configured to receive and send a signal, to implement communication between the communication apparatus and another apparatus. For example, the communication unit is configured to receive configuration information from a network device. The processing unit is configured to perform some internal operations of the communication apparatus. Functions performed by the processing unit and the communication unit corresponds to the steps in the embodiments.

In some embodiments, the communication apparatus includes a processor, and further includes a transceiver. The transceiver is configured to receive and send a signal, and the processor executes program instructions, to complete the method according to any one of the possible designs or implementations in the embodiments. The communication apparatus further includes one or more memories. The memory is configured to be coupled to the processor. The one or more memories are integrated with the processor, or are disposed independent of the processor. This is not limited in the embodiments. The memory stores a computer program or instructions for implementing the functions in the embodiments. The processor executes the computer program or instructions stored in the memory. In response to the computer program being executed or the instructions are executed, the communication apparatus is enabled to implement the method in any possible design or implementation of the embodiments.

In some embodiments, the communication apparatus includes a processor and a memory. The memory stores a computer program or instructions for implementing the functions in the embodiments. The processor executes the computer program or instructions stored in the memory. In response to the computer program being executed or the instructions are executed, the communication apparatus is enabled to implement the method in any possible design or implementation of the embodiments.

In some embodiments, the communication apparatus includes at least one processor and an interface circuit. The at least one processor is configured to: communicate with another apparatus through the interface circuit, and perform the method in any possible design or implementation of the embodiments.

Some embodiments provide a communication apparatus. The communication apparatus is a network device or a chip disposed in a network device. The communication apparatus has a function of implementing the. For example, the communication apparatus includes a corresponding module, unit, or means for performing steps in the embodiments. The function, unit or means are implemented by software, are implemented by hardware, or are implemented by hardware executing corresponding software.

In some embodiments, the communication apparatus includes a processing unit and a communication unit. The communication unit is configured to receive and send a signal, to implement communication between the communication apparatus and another apparatus. For example, the communication unit is configured to send system information to a terminal device. The processing unit is configured to perform some internal operations of the communication apparatus. Functions performed by the processing unit and the communication unit corresponds to the steps in the embodiments.

In some embodiments, the communication apparatus includes a processor, and further includes a transceiver. The transceiver is configured to receive and send a signal, and the processor executes program instructions, to complete the method according to any one of the possible designs or implementations in the embodiments. The communication apparatus further includes one or more memories. The memory is configured to be coupled to the processor. The one or more memories are integrated with the processor, or are disposed independent of the processor. This is not limited in the embodiments. The memory stores a computer program or instructions for implementing the functions in the embodiments. The processor executes the computer program or instructions stored in the memory. In response to the computer program being executed or the instructions are executed, the communication apparatus is enabled to implement the method in any possible design or implementation of the embodiments.

In some embodiments, the communication apparatus includes a processor and a memory. The memory stores a computer program or instructions for implementing the functions in the embodiments. The processor executes the computer program or instructions stored in the memory. In response to the computer program being executed or the instructions are executed, the communication apparatus is enabled to implement the method in any possible design or implementation of the embodiments.

In some embodiments, the communication apparatus includes at least one processor and an interface circuit. The at least one processor is configured to: communicate with another apparatus through the interface circuit, and perform the method in any possible design or implementation of the embodiments.

Some embodiments provide a communication system. The communication system includes a terminal device, and the terminal device is configured to perform the method in any possible design of the embodiments. The communication system further includes a network device, and the network device is configured to perform the method in any possible design of the embodiments.

Some embodiments provide a computer-readable storage medium. The computer-readable storage medium stores computer-readable instructions. In response to a computer reading and executing the computer-readable instructions, the computer is enabled to perform the method in any possible design of the embodiments.

Some embodiments provide a computer program product. In response to a computer reading and executing the computer program product, the computer is enabled to perform the method in any possible design of the embodiments.

Some embodiments provide a chip. The chip includes a processor. The processor is coupled to a memory, and is configured to read and execute a software program stored in the memory, to perform the method in any possible design of the embodiments.

The embodiments are clearer and more intelligible in descriptions in the following embodiments.

DESCRIPTION OF EMBODIMENTS

Figure 1:
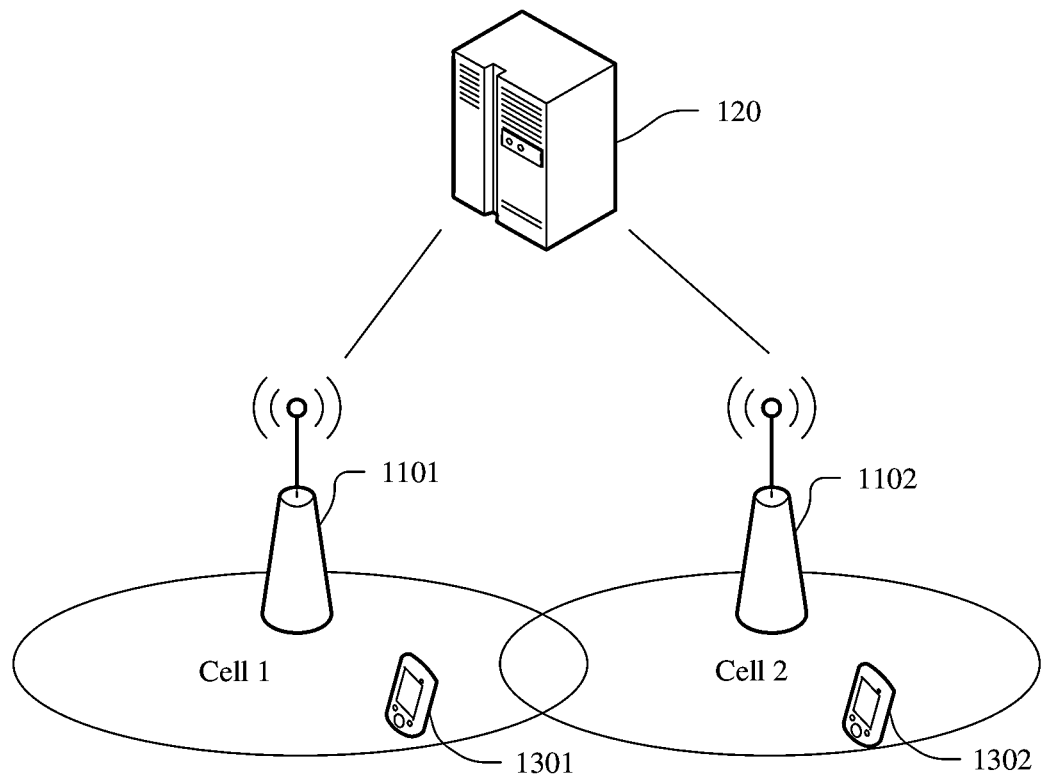
FIG. 1 is a schematic diagram of a network architecture in accordance with some embodiments.

The following clearly describes the technical solutions in the embodiments with reference to the accompanying drawings in the.

First, some terms in the embodiments are described, to help a person skilled in the art have a better understanding.

(1) Terminal device: The terminal device is a wireless terminal device that receives scheduling and indication information from a network device. The wireless terminal device is a device that provides a user with voice and/or data connectivity, a handheld device with a wireless connection function, or another processing device connected to a wireless modem. The terminal device communicates with one or more core networks or the Internet by using a radio access network (RAN). The terminal device is a mobile terminal device, for example, a mobile phone (or referred to as a cellular phone or a mobile phone (mobile phone)), a computer, or a data card. For example, the terminal device is a portable, pocket-sized, handheld, computer built-in, or in-vehicle mobile apparatus that exchange language and/or data with the radio access network. For example, the terminal device is a device such as a personal communications service (PCS) phone, a cordless phone, a session initiation protocol (SIP) phone, a wireless local loop (WLL) station, a personal digital assistant (PDA), a tablet computer (Pad), or a computer with a wireless transceiver function. The wireless terminal device further is referred to as a system, a subscriber unit (subscriber unit), a subscriber station (subscriber station), a mobile station, a mobile station (MS), a remote station (remote station), an access point (AP), a remote terminal device (remote terminal), an access terminal device (access terminal), a user terminal device (user terminal), a user agent (user agent), a subscriber station (SS), a customer premises equipment (CPE), a terminal (terminal), a user equipment (UE), a mobile terminal (MT), or the like. The terminal device further is a wearable device, a terminal device in a next-generation communication system such as a 5G communication system, a terminal device in a future evolved public land mobile network (PLMN), or the like.

(2) Network device: The network device is a device in a wireless network. For example, the network device is a radio access network (RAN) node (or device), or is referred to as a base station, through which the terminal device accesses the wireless network. Currently, some examples of the RAN device are: a next-generation NodeB (gNodeB) in a 5G communication system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In addition, in a network structure, the network device includes a centralized unit (CU) node, a distributed unit (DU) node, or a RAN device including a CU node and a DU node. In addition, in another possible case, the network device is another apparatus that provides a wireless communication function for the terminal device. A technology and a device form that are used by the network device are not limited in the embodiments. For ease of description, in the embodiments, the apparatus that provides the wireless communication function for the terminal device is referred to as a network device.

(3) The terms "system" and "network" are used interchangeably in the embodiments. "At least one" means one or more, and "a plurality of" means two or more. "And/or" describes an association relationship between associated objects, and indicates that there are three relationships. For example, A and/or B indicates the following cases: A exists, both A and B exist, and B exists, where A and B are singular or plural. The character "/" generally indicates an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in the embodiments are used to distinguish between a plurality of objects, and are not used to limit an order, a time sequence, priorities, or importance of the plurality of objects.

FIG. 1 is a schematic diagram of a network architecture in accordance with some embodiments. As shown in FIG. 1, a terminal device accesses a wireless network, to access a service of an external network (for example, the Internet) by using a wireless network, or communicate with another device by using the wireless network, for example, communicates with another terminal device. The wireless network includes a RAN and a core network (CN). The RAN is configured to connect a terminal device (for example, a terminal device 1301 or a terminal device 1302) to the wireless network, and the CN is configured to manage the terminal device and provide a gateway for communicating with an external network.

The RAN includes one or more RAN devices, for example, a RAN device 1101 and a RAN device 1102.

The CN includes one or more CN devices, for example, a CN device 120. In response to the network architecture shown in FIG. 1 being applicable to a 5G communication system, the CN device 120 is an access and mobility management function (AMF) entity, a user plane management function (UPF) entity, or the like.

In some embodiments, quantities of devices in the communication system shown in FIG. 1 are used as an example. This embodiment is not limited thereto. In some embodiments, the communication system further includes more terminal devices and more RAN devices, and further includes another device.

Figure 2:
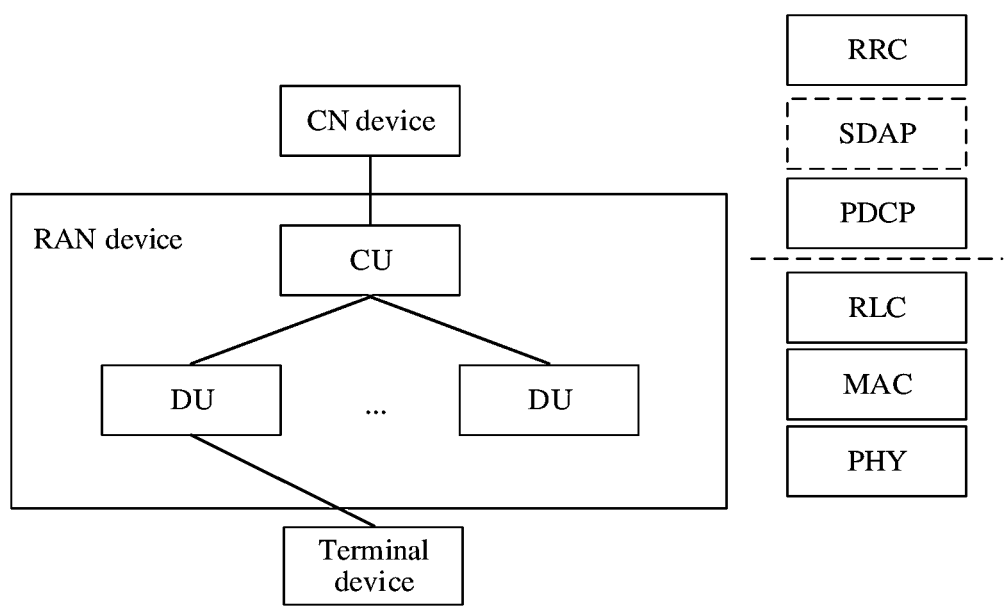
FIG. 2 is a schematic diagram of another network architecture in accordance with some embodiments.

FIG. 2 is a schematic diagram of another network architecture in accordance with some embodiments. As shown in FIG. 2, the network architecture includes a CN device, a RAN device, and a terminal device. The RAN device includes a baseband apparatus and a radio frequency apparatus. The baseband apparatus is implemented by one node, or is implemented by a plurality of nodes. The radio frequency apparatus is independently implemented remotely from the baseband apparatus, or is integrated into the baseband apparatus, or some functions are independently implemented and some functions are integrated into the baseband apparatus. For example, in an LTE communication system, a RAN device includes a baseband apparatus and a radio frequency apparatus. The radio frequency apparatus is remotely disposed relative to the baseband apparatus. For example, a remote radio unit (RRU) is a remote radio unit disposed relative to a BBU.

Communication between the RAN device and the terminal device complies with a protocol layer structure. For example, a control plane protocol layer structure includes functions of protocol layers such as an RRC layer, a packet data convergence protocol (PDCP) layer, a radio link control (RLC) layer, a media access control (MAC) layer, and a physical layer. A user plane protocol layer structure includes the functions of the protocol layers such as the PDCP layer, the RLC layer, the MAC layer, and the physical layer. In some embodiments, a service data adaptation protocol (SDAP) layer is further included above the PDCP layer.

The RAN device implements functions of protocol layers such as RRC, PDCP, RLC, and MAC by using one node or a plurality of nodes. For example, in an evolved structure, the RAN device includes a CU and a DU, and a plurality of DUs are all controlled by one CU. As shown in FIG. 2, the CU and the DU are divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is an example, and division alternatively is performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division alternatively is performed in another manner. For example, division is performed based on a latency. A function whose processing time needs to satisfy a latency demand is set on the DU, and a function whose processing time does not need to satisfy the latency demand is set on the CU.

In addition, the radio frequency apparatus is not placed in the DU but is integrated independently, or is integrated into the DU, or a part is placed remotely from the DU and a remaining part is integrated into the DU. This is not limited herein.

Figure 3:
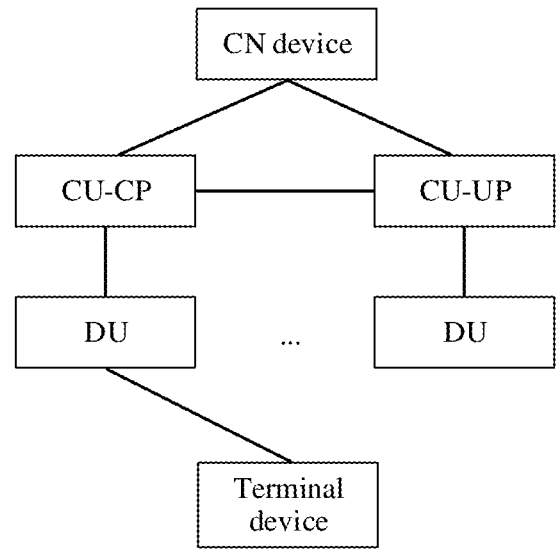
FIG. 3 is a schematic diagram of another network architecture in accordance with some embodiments.

FIG. 3 is a schematic diagram of another network architecture in accordance with some embodiments. In comparison with the network architecture shown in FIG. 2, a control plane (CP) and a user plane (UP) of a CU alternatively is separated into different entities in some embodiments, and the different entities are a control plane (CP) CU entity (namely, a CU-CP entity) and a user plane (UP) CU entity (namely, a CU-UP entity).

In the foregoing network architecture, signaling generated by the CU is sent to a terminal device by using DUs, or signaling generated by a terminal device is sent to the CU by using the DUs. The DU transparently transmits the signaling to the terminal device or the CU by directly encapsulating the signaling at a protocol layer without parsing the signaling. In the following embodiments, in response to transmission of the signaling between the DU and the terminal device being described, sending or receiving the signaling by the DU is applicable to the scenario. For example, signaling of an RRC layer or a PDCP layer is finally processed as signaling of a PHY layer and sent to the terminal device, or signaling of an RRC layer or a PDCP layer is converted from received signaling of a PHY layer. In this architecture, the signaling of the RRC or the PDCP layer further is considered to be sent by the DU, or sent by the DU and a radio frequency apparatus.

The network architecture shown in FIG. 1, FIG. 2, or FIG. 3 is applicable to communication systems of various radio access technologies (RATs). For example, the communication system is a 4G (or referred to as long term evolution (LTE)) communication system, is a 5G (or referred to as new radio (NR)) communication system, or is a transition system between the LTE communication system and the 5G communication system. The transition system further is referred to as a 4.5G communication system. In some embodiments, the communication system alternatively is a future communication system. A network architecture and a service scenario described in the embodiments are intended to describe the technical solutions in the embodiments more clearly, and do not constitute a limitation on the technical solutions provided in the embodiments. A person of ordinary skill in the art knows that with evolution of communication network architectures and emergence of new service scenarios, the technical solutions provided in the embodiments are further applicable to similar technical problems.

The apparatus in the following the embodiments are located in a terminal device or a network device based on a function implemented by the apparatus. In response to the foregoing CU-DU structure being used, the network device is a CU, a DU, or a RAN device including a CU and a DU.

In the network architecture shown in FIG. 1, FIG. 2, or FIG. 3, modes of the terminal device includes an RRC idle mode, an RRC inactive mode, and an RRC connected mode. The RRC idle mode is referred to as an idle mode for short, the RRC inactive mode is referred to as an inactive mode for short, or is referred to as a third mode, and the RRC connected mode is referred to as a connected mode for short. In response to a terminal device being in the idle mode or the inactive mode expects to perform data transmission, in a possible manner, the terminal device restores an RRC connection to the network device, in other words, the RRC mode of the terminal device is switched to the RRC connected mode, to perform data transmission; in another possible manner, the terminal device sends uplink data in a random access procedure.

For example, the random access procedure includes a four-step random access procedure and a two-step random access procedure. The terminal device sends the uplink data through a third message (Msg 3) in the four-step random access procedure; or the terminal device sends the uplink data through a message A (Msg A) in the two-step random access procedure.

1. Four-Step Random Access Procedure

Figure 4A:
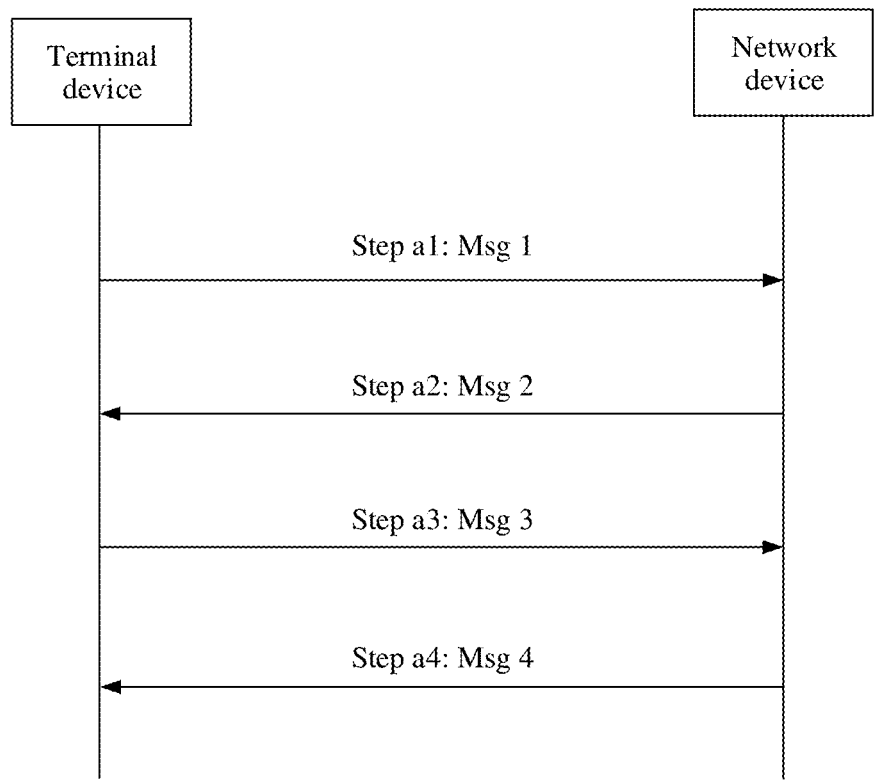
FIG. 4a is a schematic diagram of a four-step random access procedure in accordance with some embodiments.

FIG. 4a is a schematic diagram of a four-step random access procedure in accordance with some embodiments. As shown in FIG. 4a, the four-step random access procedure includes the following steps.

Step a1: The terminal device sends a random access request to the network device, where the random access request includes a random access preamble (preamble), and the network device receives the random access preamble from the terminal device. The random access request is further referred to as a first message or a message 1 (Msg 1) in the random access procedure.

Step a2: After detecting the random access preamble sent by the terminal device, the network device sends a random access response (RAR) to the terminal device, and the terminal device receives the random access response from the network device, where the random access response is further referred to as a second message or a message 2 (Msg 2) in the random access procedure.

Step a3: The terminal device sends uplink signaling to the network device, and the network device receives the uplink signaling from the terminal device. The uplink signaling is further referred to as a third message or a message 3 (Msg 3) in the random access procedure. Msg 3 includes uplink data.

Step a4: The network device receives Msg 3, and sends a contention resolution message to the terminal device. Correspondingly, the terminal device receives the contention resolution message from the network device. in response to determining, based on the contention resolution message, that the random access conflict being won, the terminal device determines that the random access succeeds; otherwise, the terminal device determines that the random access fails, and performs the random access procedure again. The contention resolution message is further referred to as a fourth message or a message 4 (Msg 4).

2. Two-Step Random Access Procedure

Figure 4B:
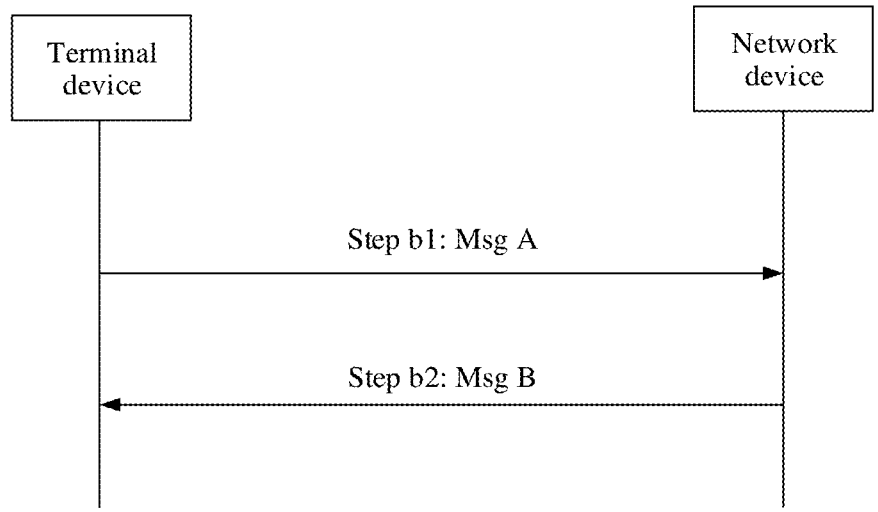
FIG. 4b is a schematic diagram of a two-step random access procedure in accordance with some embodiments.

FIG. 4b is a schematic diagram of a two-step random access procedure in accordance with some embodiments. As shown in FIG. 4b, the two-step random access procedure includes the following steps.

Step b1: The terminal device sends a random access request to the network device.

Herein, the random access request further is referred to as a message A (Msg A), and includes a random access preamble and uplink signaling. This is equivalent to Msg 1 and Msg 3 in the four-step random access procedure in FIG. 4a. Alternatively, in some embodiments, Msg 1 and Msg 3 are "sent together". In the four-step random access procedure, Msg 3 is transmitted by using an uplink grant (UL grant) carried in Msg 2. In the two-step random access procedure, the uplink signaling in Msg A is sent by using a preconfigured resource.

Step b2: The network device sends a message B (Msg B) to the terminal device.

Herein, Msg B is response information for the random access request, further is referred to as the message B, and includes at least one of response information for the random access preamble and response information for the uplink signaling.

In some embodiments, the random access procedure is classified into a contention-based random access procedure and a non-contention-based random access procedure depending on whether the random access preamble sent by the terminal device is selected by the terminal device. For the contention-based random access procedure, the network device configures a plurality of random access preambles for the terminal device, and the terminal device selects one of the random access preambles. For the non-contention-based random access procedure, the network device indicates a random access preamble to the terminal device, and the terminal device sends the indicated random access preamble. In some embodiments, a contention-based four-step random access procedure and a contention-based two-step random access procedure are used as examples, but this is not limited thereto. The embodiments further is used in a non-contention-based random access procedure.

For an application with a small data volume, using the foregoing manner (resuming the RRC connection for data transmission or performing data transmission in the random access procedure) causes unnecessary power consumption and signaling overheads. Based on this, the embodiments provide a communication method, to implement uplink transmission performed by a terminal device in an idle mode or an inactive mode, to reduce power consumption and signaling overheads of the uplink transmission.

The following first describes related technical features in some embodiments. These explanations are intended to make the embodiments easier to understand, but is unable to be considered as a limitation on the protection scope claimed.

1. Beam

In a 5G communication system, a higher carrier frequency (for example, greater than or equal to 6 GHz), for example, a 28 GHz, 38 GHz, or 72 GHz frequency band, is used to implement wireless communication with a higher bandwidth and a higher transmission rate. Consequently, a radio signal transmitted in the 5G communication system undergoes more severe fading in a space propagation process, and there is difficulty in detecting the radio signal at a receive end. Therefore, in the 5G communication system, a beamforming (BF) technology is used to obtain a beam with good directivity, to increase an antenna gain and increase power in a transmit direction. For example, on a carrier frequency lower than 6 GHz, a beam manner further is used to improve a spectrum spatial multiplexing rate.

A beam is understood as a communication resource, and the beam is a wide beam, a narrow beam, or a beam of another type. Different beams are considered as different communication resources, and same information or different information is sent through different beams. Beams include a transmit beam and a receive beam. A transmit beam is distribution of signal strength formed in different directions in space after a signal is transmitted by using an antenna, and a receive beam is distribution in which an antenna array enhances or weakens reception of a wireless signal in different directions in space. In some embodiments, for example, the network device sends information by using a transmit beam x1, and correspondingly, the terminal device receives the information by using a receive beam x2. In this case, the transmit beam x1 and the receive beam x2 is understood as a beam pair. In some embodiments, a transmit beam and a receive beam are not clearly distinguished temporarily. The transmit beam x1 and the receive beam x2 is collectively referred to as a beam x. In this way, in some embodiments, the network device sends the information by using the beam x, and correspondingly, the terminal device receives the information by using the beam x.

In a protocol, a beam is represented by using various identifiers of signals, for example, an index of a synchronization signal/physical broadcast channel block (synchronous signal/physical broadcast channel block, SS/PBCH block, which further is referred to as an SSB for short). In other words, there is a correspondence between the beam and the SSB.

2. SSB

In the network architecture shown in FIG. 1, FIG. 2, or FIG. 3, the terminal device receives a synchronization signal and PBCH block sent by the network device to synchronize with the network device, obtain system information, and the like.

(1) Composition of the SSB

Figure 5A:
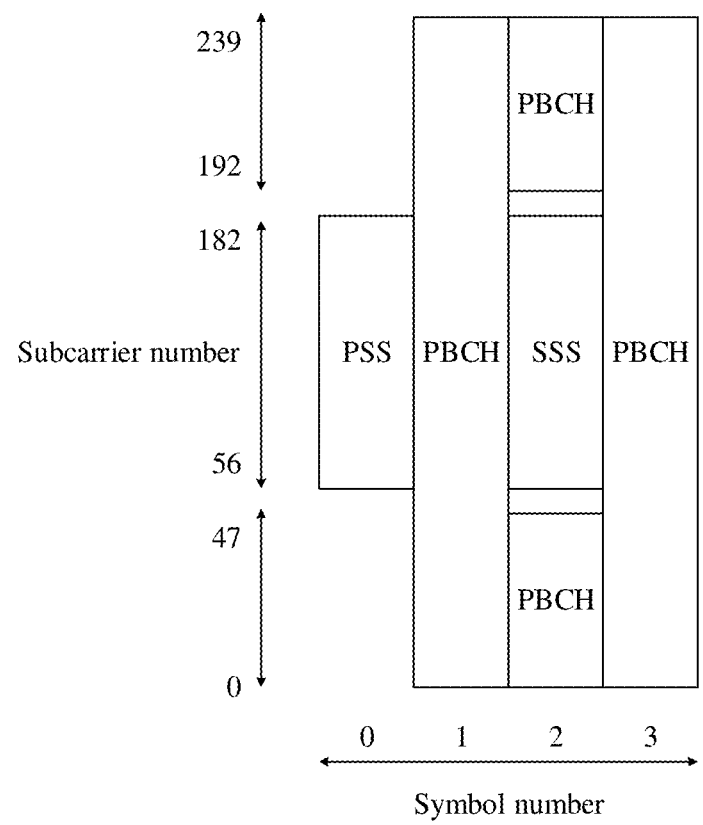
FIG. 5a is a schematic diagram of an SSB in accordance with some embodiments.

In some embodiments, the SSB includes a primary synchronization signal (PSS), a secondary synchronization signal (SSS), and a physical broadcast channel (PBCH). As shown in FIG. 5a, in time domain, one SSB occupies four orthogonal frequency division multiplexing (OFDM) symbols (symbols), which are symbol 0 to symbol 3. In frequency domain, one SSB occupies 20 resource blocks (RBs) (where one RB includes 12 subcarriers), that is, 240 subcarriers, and subcarrier numbers are 0 to 239. The PSS is located on 127 subcarriers in the middle of symbol 0, and the SSS is located on 127 subcarriers in the middle of symbol 2. To protect the PSS and the SSS, there are different guard subcarriers. The guard subcarriers do not carry signals, and subcarriers are separately reserved on two sides of the SSS as guard subcarriers. For example, blank areas on the two sides of the SSS in FIG. 5a are guard subcarriers. The PBCH occupies all subcarriers of symbol 1 and symbol 3, and occupies some subcarriers (in other words, subcarriers other than guard subcarriers) in remaining subcarriers other than the subcarriers occupied by the SSS in all subcarriers of symbol 2.

The PSS indicates a cell number, and the SSS indicates a cell group number. The cell number and the cell group number jointly determine a plurality of physical cell identifiers (PCIs) in the 5G communication system. Once the terminal device successfully finds the PSS and the SSS, the terminal device knows a physical cell identifier of the 5G carrier, and therefore has a capability of parsing system information included in the SSB.

The system information in the SSB is carried on a PBCH channel Because the information is information called for by the terminal device to access a network, the information is referred to as a main information block (MIB). The MIB includes a system frame number, a subcarrier spacing for initial access, and other information. Further, the terminal device further receives some other possible system information. For example, the terminal device obtains, from the MIB, a parameter used for transmission of a system information block (SIB) 1 and a distribution status of control resources for scheduling the SIB 1, and further receives the SIB 1.

(2) Sending Mechanism of the SSB

Figure 5B:
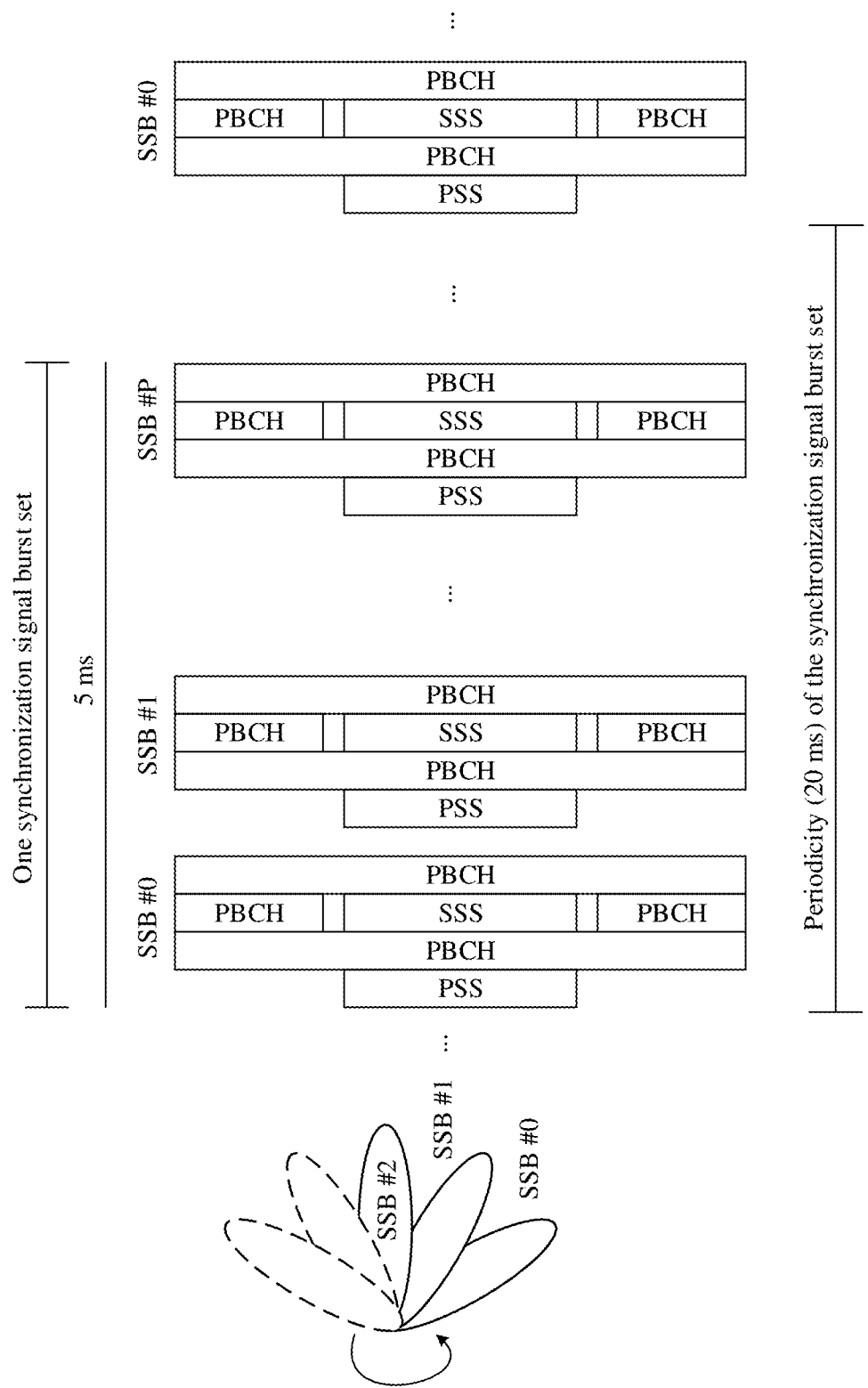
FIG. 5b is a schematic diagram of a synchronization burst set in accordance with some embodiments.

In the 5G communication system, for a cell (or a carrier), a network device sends SSBs by using different beams at different moments, to implement broadcast beam coverage of the cell. As shown in FIG. 5b, the network device sends SSB #0 by using beam 0, sends SSB #1 by using beam 1, sends SSB #2 by using beam 2, and the like. In this case, in some embodiments, beam 0 corresponds to SSB #0, beam 1 corresponds to SSB #1, and beam 2 corresponds to SSB #2.

A set of SSBs sent by the network device in one beam scanning process is referred to as a synchronization burst set (SS burst set). An SS burst set periodicity is equivalent to a periodicity of SSBs corresponding to a beam, and is set to 5 ms (milliseconds), 10 ms, 20 ms, 40 ms, 80 ms, 160 ms, or the like.

Currently, there are a maximum of four, eight, or 64 SSBs in one SS burst set periodicity. In response to a carrier frequency band being less than or equal to 3 GHz, there are a maximum of four SSBs in one SS burst set periodicity. Each SS burst set is located in a time interval of 5 ms. For an example of the SS burst set, refer to FIG. 5b. In FIG. 5b, an example in which the SS burst set periodicity is 20 ms and one SS burst set includes P SSBs is used, where P is a positive integer.

(3) The SSB Corresponds to a Random Access Resource

For a cell, the network device indicates a correspondence between an SSB of the cell and a random access resource to the terminal device. For example, the network device indicates the correspondence between the SSB of the cell and the random access resource to the terminal device by using system information. In another possible example, the correspondence between the SSB of the cell and the random access resource alternatively is predetermined in a protocol.

For example, the SS burst set of the cell includes three SSBs: SSB #0, SSB #1, and SSB #2. Table 1 shows an example of the correspondence between the SSB of the cell and the random access resource.

TABLE 1

Example of the correspondence between the SSB and the random access resource

| SSB | Random access resource corresponding to the SSB |
|---|---|
| SSB #0 | Random access resource 0 |
| SSB #1 | Random access resource 1 |
| SSB #2 | Random access resource 2 |

The random access resource (for example, the random access resource 0, the random access resource 1, or the random access resource 2) includes a time-frequency resource carrying a random access preamble, for example, a physical random access channel (PRACH) resource; includes a random access preamble; or includes a time-frequency resource carrying a random access preamble and the random access preamble.

3. Quasi Co-Location (QCL)

Quasi co-location indicates that a plurality of resources have one or more same or similar communication features. A same or similar communication configuration is used for the plurality of resources having the quasi co-location relationship. For example, in response to two antenna ports being configured to have a co-location relationship, a large-scale channel property in which one port transmits a symbol is inferred from a large-scale channel property in which the other port transmits a symbol.

The large-scale channel property includes a plurality of possible parameters. In the 5G communication system, parameters included in the large-scale channel property are classified into four types, that is, four types of QCL information: QCL type (type) A: Doppler shift (Doppler shift), Doppler spread (Doppler spread), average channel delay (average delay), and delay spread (delay spread); QCL type B: Doppler shift and Doppler spread; QCL type C: average delay and Doppler shift; and QCL type D: spatial reception parameter (spatial rx parameter). The spatial reception parameter includes a dominant angle of arrival (AoA) or an average angle of arrival of a signal.

For example, from a perspective of the terminal device, in response to a demodulation reference signal (DMRS) and an SSB of a physical downlink control channel (PDCCH) meeting QCL Type D, the terminal device receives the DMRS of the PDCCH based on a spatial reception parameter of the SSB, or in some embodiments, the terminal device receives the DMRS and the SSB of the PDCCH by using a same beam, or in some embodiments, the terminal device receives the DMRS of the PDCCH on a beam corresponding to the SSB.

Similarly, from a perspective of the network device, in response to a DMRS and an SSB of a PDCCH meet QCL Type D, the network device sending the DMRS of the PDCCH based on a spatial transmission parameter (spatial tx parameter) of the SSB, or in some embodiments, the network device sends the DMRS and the SSB of the PDCCH by using a same beam, or in some embodiments, the network device sends the DMRS of the PDCCH on a beam corresponding to the SSB. The spatial transmission parameter includes a dominant angle of departure or an average angle of departure of a signal.

4. PUSCH Occasion

A physical uplink shared channel (PUSCH) occasion (occasion) further is referred to as a PUSCH occasion. The PUSCH occasion is used for PUSCH transmission, and is set out by a resource. The resource is a frequency domain resource, or the resource is a time domain resource, or the resource is a frequency domain resource and a time domain resource. Further, the PUSCH occasion is associated with a DMRS resource, and the DMRS resource includes DMRS port information and/or DMRS sequence information. The DMRS resource is configured in DMRS configuration information, and the DMRS configuration information is included in PUSCH configuration information, or is sent by the network device to the terminal device in another manner.

In some embodiments: (1) in response to the PUSCH occasion being set out by a frequency domain resource, in some embodiments, the PUSCH occasion includes a frequency domain resource. (2) in response to the PUSCH occasion being set out by a time domain resource, in some embodiments, the PUSCH occasion includes the time domain resource. (3) in response to the PUSCH occasion being set out by a frequency domain resource and a time domain resource, in some embodiments, the PUSCH occasion includes the frequency domain resource and time domain resource. (4) in response to the PUSCH occasion being associated with a DMRS resource, in some embodiments, the PUSCH occasion is associated with a DMRS port (port) and/or a DMRS sequence.

The DMRS is used for channel estimation. For example, the network device performs channel estimation based on the DMRS, to perform coherent demodulation on an uplink PUSCH or PUCCH. The DMRS port represents a channel, and different DMRS ports correspond to different resource elements (REs). A plurality of DMRS ports are predetermined in a protocol, or the network device indicates a quantity of DMRS ports. After determining the quantity of DMRS ports, the terminal device learns of an RE corresponding to each DMRS port, and further maps a DMRS sequence to the RE corresponding to the DMRS port and send the RE to the network device.

5. PUSCH Configuration Information

The PUSCH configuration information is used to configure a plurality of PUSCH occasions. For example, the PUSCH configuration information includes at least one of time domain resource configuration information, frequency domain resource configuration information, and DMRS configuration information.

(1) Time Domain Resource Configuration Information

For example, the time domain resource configuration information includes a periodicity, a slot including a PUSCH occasion in each periodicity, and a quantity of PUSCH occasions included in each slot. For example, refer to FIG. 5c. The periodicity is 10 slots, the slot including a PUSCH occasion in each periodicity is fourth slot (for example, slot 3 in periodicity 1 and slot 13 in periodicity 2), and each slot (for example, slot 3 or slot 13) includes two PUSCH occasions. Further, each PUSCH occasion occupies five symbols. In this case, in each slot (for example, slot 3 or slot 13), an index of a time domain resource of the PUSCH occasion is 0 or 1.

In some embodiments, the time domain resource configuration information is unable to include the periodicity, in other words, the periodicity is configured in another manner. This is not limited.

(2) Frequency Domain Resource Configuration Information

For example, the frequency domain resource configuration information includes a frequency domain resource start position, a quantity of physical resource blocks (PRBs) occupied by each PUSCH occasion, and a quantity of PUSCH occasions. For example, refer to FIG. 5d. in response to the quantity of PUSCH occasions configured in frequency domain being 3, and each PUSCH occasion occupies 10 PRBs, an index of a frequency domain resource of the PUSCH occasion is 0, 1, or 2.

(3) DMRS Configuration Information

The DMRS configuration information includes at least one of DMRS sequence information (for example, DMRS sequence 0 and DMRS sequence 1) and/or DMRS port quantity indication information (for example, two ports, which are respectively DMRS port 0 and DMRS port 1).

Figure 5C:
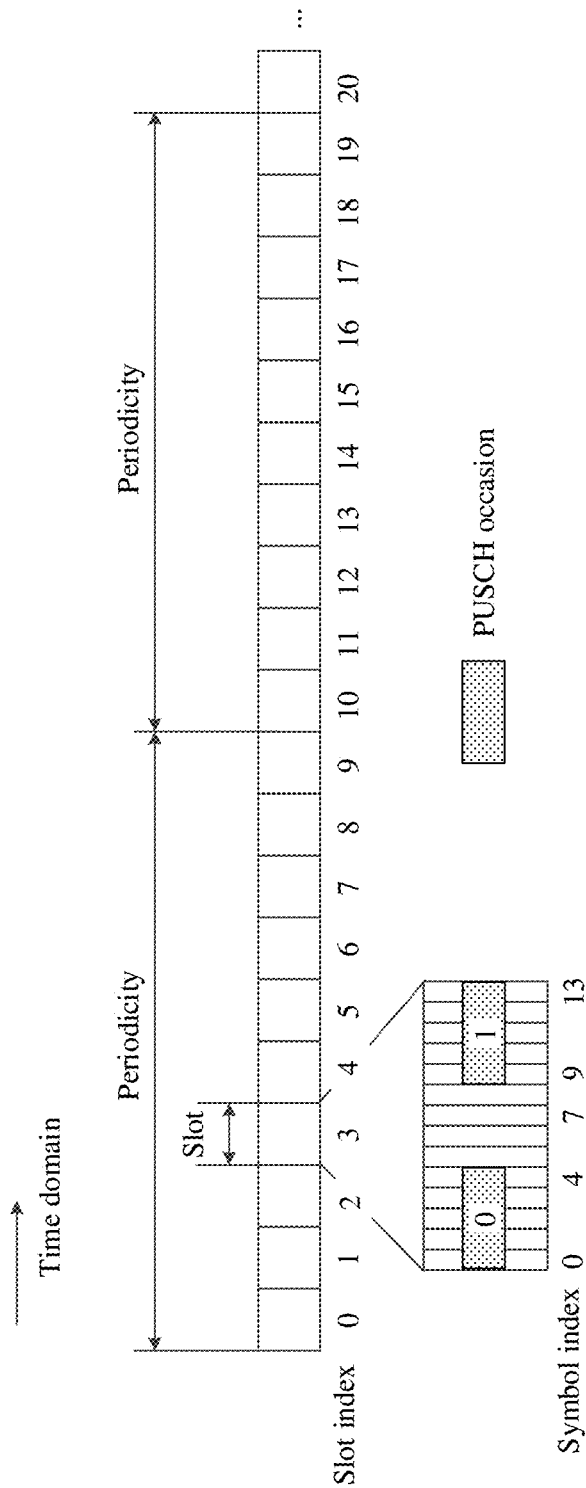
FIG. 5c shows an example of PUSCH occasions in accordance with some embodiments.
Figure 5D:
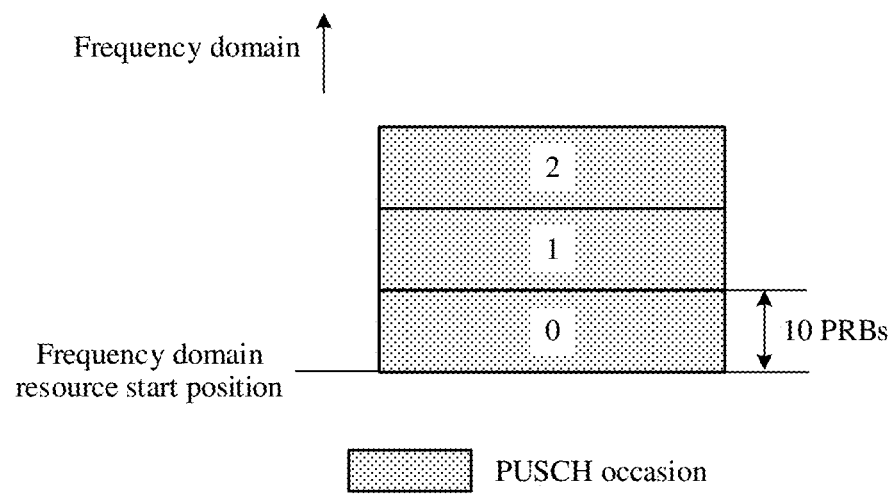
FIG. 5d shows another example of PUSCH occasions in accordance with some embodiments.
Figure 5E:
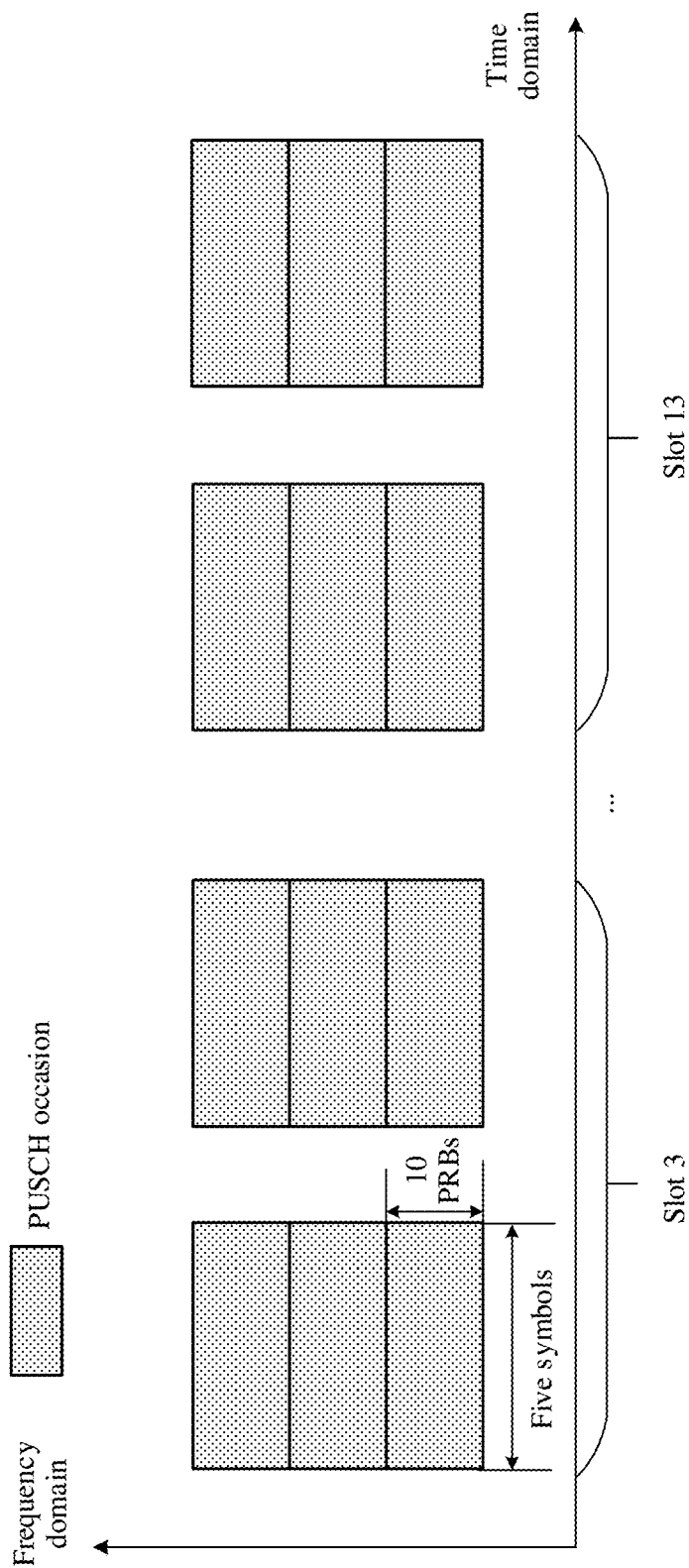
FIG. 5e shows another example of PUSCH occasions in accordance with some embodiments.

In some embodiments, (1) The PUSCH occasion shown in FIG. 5c is understood as a PUSCH occasion set out by a time domain resource, and the PUSCH occasion shown in FIG. 5d is understood as a PUSCH occasion set out by a frequency domain resource. Refer to FIG. 5e. In response to a PUSCH occasion being set out by a time domain resource and a frequency domain resource, each PUSCH occasion includes 10 PRBs in frequency domain and include five symbols in time domain. In this case, one PUSCH occasion is understood as one PUSCH resource block shown in FIG. 5e. One PUSCH resource block includes one or more subcarriers in frequency domain, and includes one or more symbols in time domain.

Further, on the basis of FIG. 5e, in response to two DMRS sequences and two DMRS ports being configured in the DMRS configuration information, in response to one PUSCH occasion being associated with one DMRS port and one DMRS sequence, one PUSCH resource block corresponds to four PUSCH occasions. For example, the four PUSCH occasions are respectively PUSCH occasion a, PUSCH occasion b, PUSCH occasion c, and PUSCH occasion d. PUSCH occasion a is associated with DMRS port 0 and DMRS sequence 1, PUSCH occasion b is associated with DMRS port 1 and DMRS sequence 1, PUSCH occasion c is associated with DMRS port 0 and DMRS sequence 2, and PUSCH occasion d is associated with DMRS port 1 and DMRS sequence 2.

In some embodiments, an example in which a PUSCH occasion is set out by a frequency domain resource and a time domain resource (in other words, each PUSCH occasion corresponds to one PUSCH resource block) and is associated with one DMRS port and one DMRS sequence is used for description.

(2) The foregoing describes information that is included in the PUSCH configuration information. In another possible example, the PUSCH configuration information further includes other possible information, such as a modulation and coding scheme (MCS) and a transport block size (TBS).

(3) A resource (including a time domain resource and/or a frequency domain resource) configured based on the PUSCH configuration information is an uplink grant-free resource. In response to the terminal device having a call for transmitting uplink data, the terminal device transmits the uplink data by using the resource configured based on the PUSCH configuration information. The uplink transmission is referred to as configured grant (CG). Correspondingly, after receiving the uplink data from the terminal device, the network device sends a downlink response message to the terminal device. The downlink response message is referred to as a CG response (response) message.

6. PUSCH Resource Unit

In some embodiments, the example in which the PUSCH occasion is set out by a frequency domain resource and a time domain resource, and is associated with one DMRS port and one DMRS sequence is used. For ease of understanding the solution provided, a PUSCH resource unit is introduced in the following descriptions, and the PUSCH resource unit includes one or more PUSCH occasions.

Example 1: A PUSCH resource unit includes a plurality of PUSCH occasions corresponding to a same PUSCH resource block.

Example 2: A PUSCH resource unit includes a plurality of PUSCH occasions corresponding to a same PUSCH resource block group, and the PUSCH resource block group includes a plurality of PUSCH resource blocks with a same time domain resource and different frequency domain resources. For example, three PUSCH resource blocks in a leftmost column shown in FIG. 5e is considered as one PUSCH resource block group.

In some embodiments, two possible cases of the relationship between the PUSCH resource unit and the PUSCH occasion are first described herein, and more possible cases are provided below. In some possible cases, in response to another possible description being performed on the PUSCH occasion, the PUSCH resource unit is understood as the PUSCH occasion. For example, in the foregoing Example 1, in response to the PUSCH occasion being set out by a frequency domain resource and a time domain resource, the PUSCH resource unit is the PUSCH occasion.

Based on descriptions of the foregoing related technical features, the following describes in detail the communication method provided in some embodiments.

For example, the communication method provided in the embodiments includes two possible solutions: Solution 1 and Solution 2. In Solution 1, a terminal device receives a first SSB, determines a PUSCH occasion corresponding to the first SSB, and sends uplink information by using the PUSCH occasion corresponding to the first SSB; and further, the terminal device receives, based on a spatial reception parameter of the first SSB, downlink information sent by a network device. In this manner, because there is a correspondence between the SSB and the PUSCH occasion, in a cell with a beam operation, the terminal device in an idle mode or an inactive mode sends the uplink information by using the PUSCH occasion corresponding to the SSB, and receive downlink information based on a spatial reception parameter of the SSB. In comparison with a manner of restoring an RRC connection for data transmission or performing data transmission in a random access procedure, power consumption and signaling overheads of uplink transmission is effectively reduced.

In Solution 2, the terminal device receives a first SSB, and in response to determining that a measurement value of the first SSB is less than or equal to a preset threshold, initiates random access to a network device by using a random access resource corresponding to a second SSB, and the random access succeeds; and the terminal device receives downlink information based on a spatial reception parameter of the second SSB. In this manner, in a cell with a beam operation, a serving SSB is maintained between the terminal device and the network device, so that the terminal device in an idle mode or an inactive mode sends uplink information, and receive the downlink information based on a spatial reception parameter of the serving SSB. In comparison with a manner of restoring an RRC connection for data transmission or performing data transmission in a random access procedure, power consumption and signaling overheads of uplink transmission is effectively reduced. Further, in response to a measurement value of the serving SSB being less than or equal to the preset threshold, the terminal device notifies, by using a random access procedure, the network device to switch the serving SSB, to effectively ensure normal communication between the terminal device and the network device based on the serving SSB, and reduce a problem of a communication failure caused due to a low measurement value of the serving SSB.

In some embodiments, a communication method is described.

Figure 6:
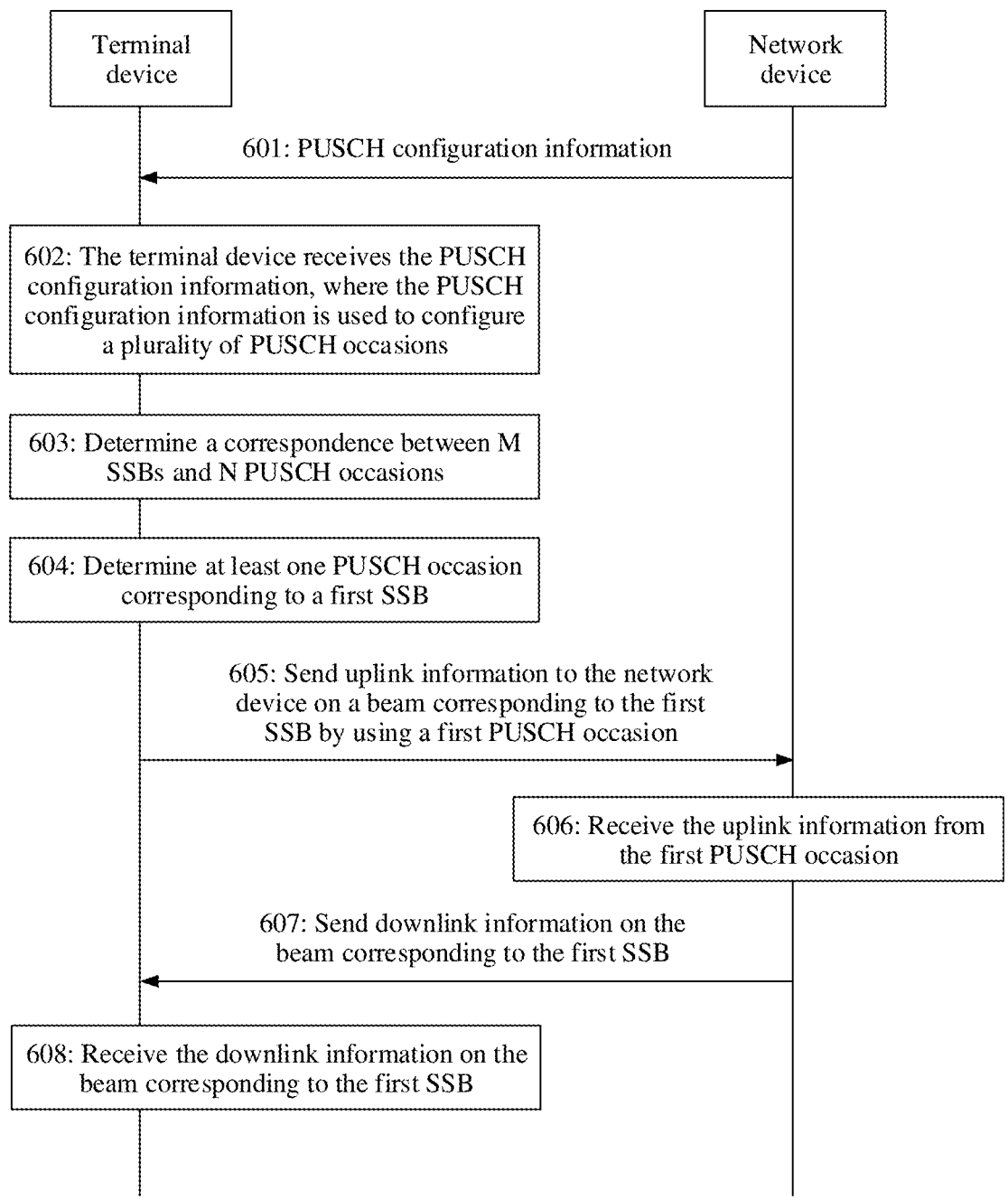
FIG. 6 is a schematic flowchart corresponding to a communication method in accordance with some embodiments.

FIG. 6 is a schematic flowchart corresponding to the communication method in accordance with some embodiments. As shown in FIG. 6, the method includes the following steps.

Step 601: A network device sends PUSCH configuration information to a terminal device.

Correspondingly, in step 602, the terminal device receives the PUSCH configuration information, where the PUSCH configuration information is used to configure a plurality of PUSCH occasions. For example, each PUSCH occasion is set out by a frequency domain resource and a time domain resource, and is associated with a DMRS port and a DMRS sequence.

For example, the network device sends the PUSCH configuration information to the terminal device in a plurality of manners. For example, the network device sends system information to the terminal device, where the system information includes the PUSCH configuration information. In an example, the system information is SIB 1.

In some embodiments, the terminal device in step 601 and step 602 is in a connected mode, or is in an idle mode or an inactive mode. In other words, the terminal device receives the PUSCH configuration information in the connected mode, or receives the PUSCH configuration information in the idle mode or the inactive mode.

Step 603: The terminal device determines a correspondence between M SSBs and N PUSCH occasions. The M SSBs include a first SSB, and M and N are positive integers.

1. The M SSBs and the N PUSCH Occasions are Separately Described.

(1) The M SSBs are some or all SSBs in an SS burst set of a cell. In other words, M is less than or equal to a quantity of SSBs included in the SS burst set. For example, the quantity of SSBs included in the SS burst set is equal to 3. For example, M is equal to the quantity (for example, 3) of SSBs included in the SS burst set. After receiving three SSBs, the terminal device obtains indexes of the three SSBs. For example, indexes of the three SSBs are respectively SSB #0, SSB #1, and SSB #2.

(2) The N PUSCH occasions are PUSCH occasions that are in a preset time period and that are in a plurality of PUSCH occasions configured in the PUSCH configuration information. A length of the preset time period is indicated by the network device to the terminal device, or is pre-agreed in a protocol. This is not limited. For example, a unit of the preset time period is a frame, a subframe, a slot, a symbol, or the like. For example, the preset time period is 20 slots. In this case, the terminal device determines a correspondence between the M SSBs and the PUSCH occasions in the preset time period for each preset time period. In an example, a start position of a first preset time period is a start position of a reference radio frame, and a reference radio frame is indicated by the network device to the terminal device, or is pre-agreed in a protocol. For example, the reference radio frame is a radio frame 0.

Further, the N PUSCH occasions are valid PUSCH occasions within a preset time period, and the valid PUSCH occasions are PUSCH occasions that is used to send uplink information. For example, in response to the solution in some embodiments being applied to a time division duplex (TDD) system, because the TDD system includes a time domain resource for uplink transmission and a time domain resource for downlink transmission, in response to a preset time period including 32 PUSCH occasions, and time domain resources occupied by eight PUSCH occasions are time domain resources for downlink transmission, the eight PUSCH occasions is unable to be used to send uplink information. In this case, the eight PUSCH occasions are understood as invalid PUSCH occasions, and remaining 24 PUSCH occasions are understood as valid PUSCH occasions.

2. A Manner in which the Terminal Device Determines the Correspondence Between the M SSBs and the N PUSCH Occasions is Described.

In some embodiments, the terminal device determines the correspondence between the M SSBs and the N PUSCH occasions in a plurality of manners. The following describes a possible implementation.

In some embodiments, that the terminal device determines the correspondence between the M SSBs and the N PUSCH occasions means that the terminal device maps indexes of the M SSBs to PUSCH occasions arranged according to at least one of the following:

A. For PUSCH occasions multiplexed in frequency domain, the PUSCH occasions are sorted in ascending order of indexes of frequency domain resources of the PUSCH occasions.

B. ① For PUSCH occasions corresponding to a same PUSCH resource block, the PUSCH occasions are sorted based on indexes of DMRS resources associated with the PUSCH occasions. Sorting in ascending order of the indexes of the DMRS resources associated with the PUSCH occasions refers to: first sorting in ascending order of indexes of DMRS ports associated with the PUSCH occasions, and then sorting in ascending order of indexes of DMRS sequences associated with the PUSCH occasions; or first sorting in ascending order of indexes of DMRS sequences associated with the PUSCH occasions, and then sorting in ascending order of indexes of DMRS ports associated with the PUSCH occasions. ② Alternatively, for PUSCH occasions corresponding to a same PUSCH resource block, the PUSCH occasions are sorted in ascending order of indexes of DMRS ports associated with the PUSCH occasions. ③ Alternatively, for PUSCH occasions corresponding to a same PUSCH resource block, the PUSCH occasions are sorted in ascending order of indexes of DMRS sequences associated with the PUSCH occasions.

C. For PUSCH occasions that are multiplexed in time domain and that are in a same slot, the PUSCH occasions are sorted in ascending order of indexes of time domain resources of the PUSCH occasions.

D. For PUSCH occasions in different slots, the PUSCH occasions are sorted in ascending order of indexes of slots in which the PUSCH occasions are located.

In some embodiments, that the terminal device determines the correspondence between the M SSBs and the N PUSCH occasions further means that the terminal device maps indexes of the M SSBs to PUSCH occasions and the associated DMRS resources arranged according to at least one of the following:

A. For PUSCH occasions multiplexed in frequency domain, the PUSCH occasions are sorted in ascending order of indexes of frequency domain resources of the PUSCH occasions.

B. ① In one PUSCH occasion, the DMRS resources are sorted based on indexes of DMRS resources associated with the PUSCH occasions. Sorting in ascending order of the indexes of the DMRS resources associated with the PUSCH occasions refers to: first sorting in ascending order of indexes of DMRS ports associated with the PUSCH occasions, and then sorting in ascending order of indexes of DMRS sequences associated with the PUSCH occasions; or first sorting in ascending order of indexes of DMRS sequences associated with the PUSCH occasions, and then sorting in ascending order of indexes of DMRS ports associated with the PUSCH occasions. ② Alternatively, in one PUSCH occasion, the DMRS resources are sorted in ascending order of indexes of DMRS ports associated with the PUSCH occasions. ③ Alternatively, in one PUSCH occasion, the DMRS resources are sorted in ascending order of indexes of DMRS sequences associated with the PUSCH occasions.

C. For PUSCH occasions that are multiplexed in time domain and that are in a same slot, the PUSCH occasions are sorted in ascending order of indexes of time domain resources of the PUSCH occasions.

D. For PUSCH occasions in different slots, the PUSCH occasions are sorted in ascending order of indexes of slots in which the PUSCH occasions are located.

In some embodiments, the PUSCH occasions multiplexed in frequency domain is understood as PUSCH occasions with different frequency domain resources. Refer to FIG. 5d. A PUSCH occasion with an index of a frequency domain resource being 0, a PUSCH occasion with an index of a frequency domain resource being 1, and a PUSCH occasion with an index of a frequency domain resource being 2 are PUSCH occasions multiplexed in frequency domain. Similarly, the PUSCH occasions multiplexed in time domain is understood as PUSCH occasions with different time domain resources. Refer to FIG. 5c. A PUSCH occasion with an index of a time domain resource being 0 and a PUSCH occasion with an index of a time domain resource being 1 are PUSCH occasions multiplexed in time domain.

In addition, the ascending order in any one of the foregoing forms are replaced with a descending order.

Details are described in the following.

For example, the terminal device determines indexes of the N PUSCH occasions, and further determine the correspondence between the M SSBs and the N PUSCH occasions based on the indexes of the M SSBs and the indexes of the N PUSCH occasions.

(1) Determine the Indexes of the N PUSCH Occasions

The terminal device determines the indexes of the N PUSCH occasions in a plurality of manners. For example, the terminal device determines the indexes of the N PUSCH occasions based on at least one of indexes of frequency domain resources of the N PUSCH occasions (for example, in the foregoing operation A), indexes of time domain resources of the N PUSCH occasions (for example, in the foregoing operation C), indexes of slots in which the N PUSCH occasions are located (for example, in the foregoing operation D), and indexes of DMRS resources associated with the N PUSCH occasions (for example, in the foregoing operation B).

For example, in response to the PUSCH occasion being set out by a frequency domain resource and a time domain resource, and one PUSCH occasion is associated with one DMRS port and one DMRS sequence, the terminal device determines indexes of P PUSCH resource units, and an index of each PUSCH resource unit is an index of one or more PUSCH occasions included in the PUSCH resource unit. In other words, determining the indexes of the P PUSCH resource units is determining the indexes of the N PUSCH occasions. The indexes of the P PUSCH resource units are indexes of a plurality of PUSCH resource units in a first sequence, and the first sequence is obtained by sorting the plurality of PUSCH resource units.

The following describes some embodiments of determining the indexes of the P PUSCH resource units with reference to examples. In some embodiments, the PUSCH configuration information received by the terminal device includes time domain resource configuration information, frequency domain resource configuration information, and DMRS configuration information, as described in the foregoing examples. A periodicity configured in the time domain resource configuration information is 10 slots, a slot including PUSCH occasions in each periodicity is the fourth slot, and each slot (for example, slot 3) includes two PUSCH occasions. Further, each PUSCH occasion occupies five symbols. A quantity of PUSCH occasions configured in the frequency domain resource configuration information is 3, and each PUSCH occasion occupies 10 PRBs. The DMRS configuration information configures DMRS sequence 0, DMRS sequence 1, DMRS port 0, and DMRS port 1. In addition, in some embodiments, a length of a preset time period is 20 slots. A total of 12 PUSCH resource blocks are included in the preset time period, and each resource block corresponds to four PUSCH occasions, that is, there are 48 PUSCH occasions in total. An example in which all the 48 PUSCH occasions are valid PUSCH occasions is used.

Example 1

In Example 1, one PUSCH resource unit includes one PUSCH occasion, in other words, the PUSCH resource unit is the PUSCH occasion. In this case, P=N=48.

Sorting the plurality of PUSCH occasions includes the following operations:

A. For PUSCH occasions multiplexed in frequency domain, the PUSCH occasions are sorted in ascending order of indexes of frequency domain resources of the PUSCH occasions.

B. ① For PUSCH occasions corresponding to a same PUSCH resource block, the PUSCH occasions are sorted based on indexes of DMRS resources associated with the PUSCH occasions. Sorting based on the indexes of the DMRS resources associated with the PUSCH occasions refers to: first sorting in ascending order of indexes of DMRS ports associated with the PUSCH occasions, and then sorting in ascending order of indexes of DMRS sequences associated with the PUSCH occasions. ② Alternatively, for PUSCH occasions corresponding to a same PUSCH resource block, the PUSCH occasions are sorted in ascending order of indexes of DMRS ports associated with the PUSCH occasions. ③ Alternatively, for PUSCH occasions corresponding to a same PUSCH resource block, the PUSCH occasions are sorted in ascending order of indexes of DMRS sequences associated with the PUSCH occasions. In this example, ① in B is used as an example for description.

C. For PUSCH occasions that are multiplexed in time domain and that are in a same slot, the PUSCH occasions are sorted in ascending order of indexes of time domain resources of the PUSCH occasions.

D. For PUSCH occasions in different slots, the PUSCH occasions are sorted in ascending order of indexes of slots in which the PUSCH occasions are located.

Figure 7A:
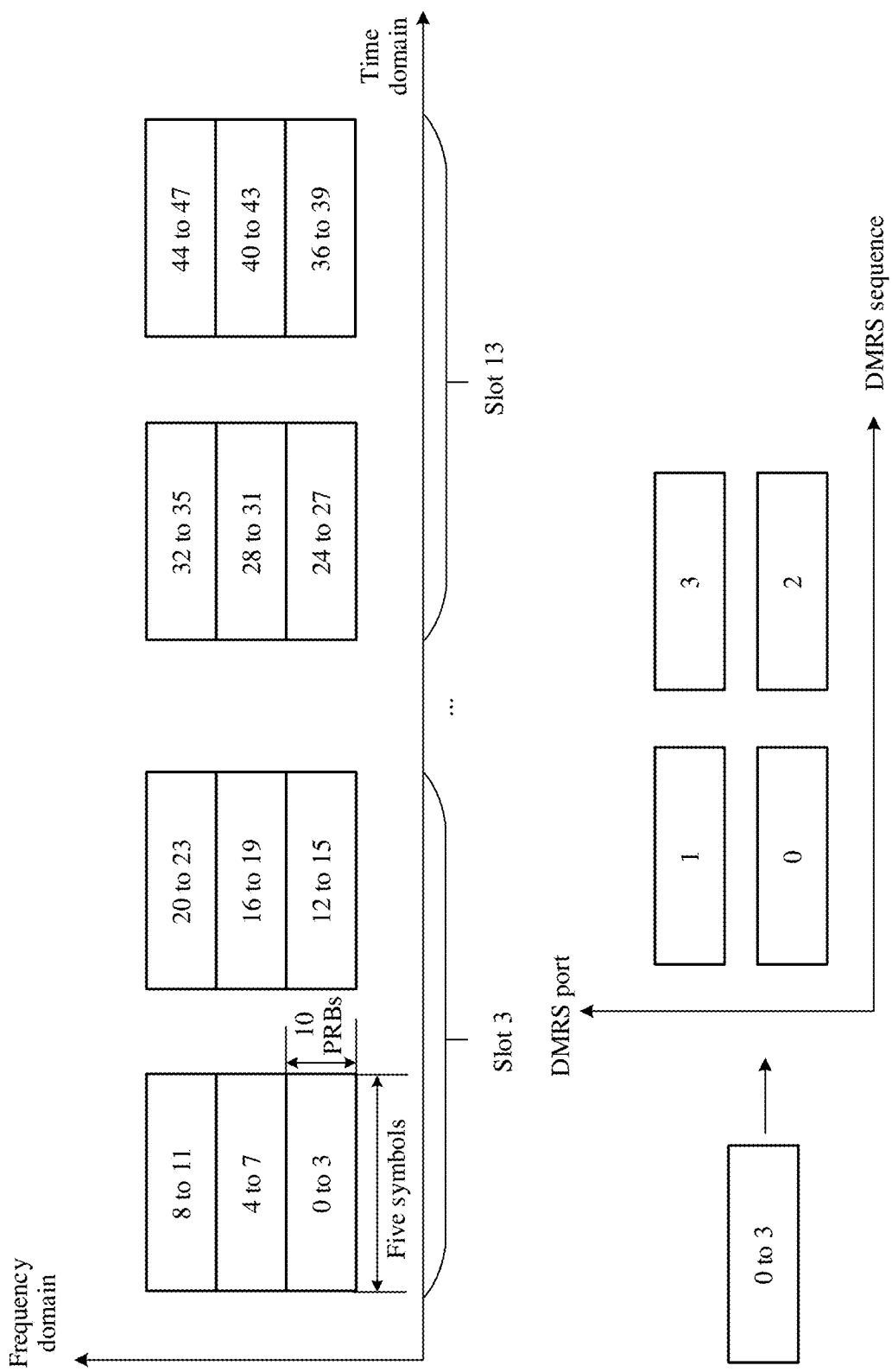
FIG. 7a, FIG. 7b, FIG. 7c, FIG. 7d, FIG. 7e, and FIG. 7f are diagrams of several examples of indexes of PUSCH occasions in accordance with some embodiments.

In this way, the first sequence and the index of each PUSCH occasion (or PUSCH resource unit) in the first sequence is obtained by performing the foregoing A, B, C, and D. FIG. 7a shows the index of each PUSCH occasion.

In some embodiments, a sequence of performing the foregoing four operations A, B, C, and D is not limited, and depends on internal implementation of the terminal device.

Example 2

In Example 2, one PUSCH resource unit includes four PUSCH occasions corresponding to a same PUSCH resource block. In this case, P=12. An index of a frequency domain resource of the PUSCH resource unit is indexes of frequency domain resources of the four PUSCH occasions, and an index of a time domain resource of the PUSCH resource unit is indexes of time domain resources of the four PUSCH occasions.

Sorting the plurality of PUSCH resource units includes the following operations:

A. For PUSCH resource units multiplexed in frequency domain, the PUSCH resource units are sorted in ascending order of indexes of frequency domain resources of the PUSCH resource units.

C. For PUSCH resource units that are multiplexed in time domain and that are in a same slot, the PUSCH resource units are sorted in ascending order of indexes of time domain resources of the PUSCH resource units.

D. For PUSCH resource units in different slots, the PUSCH resource units are sorted in ascending order of indexes of slots in which the PUSCH resource units are located.

Figure 7B:
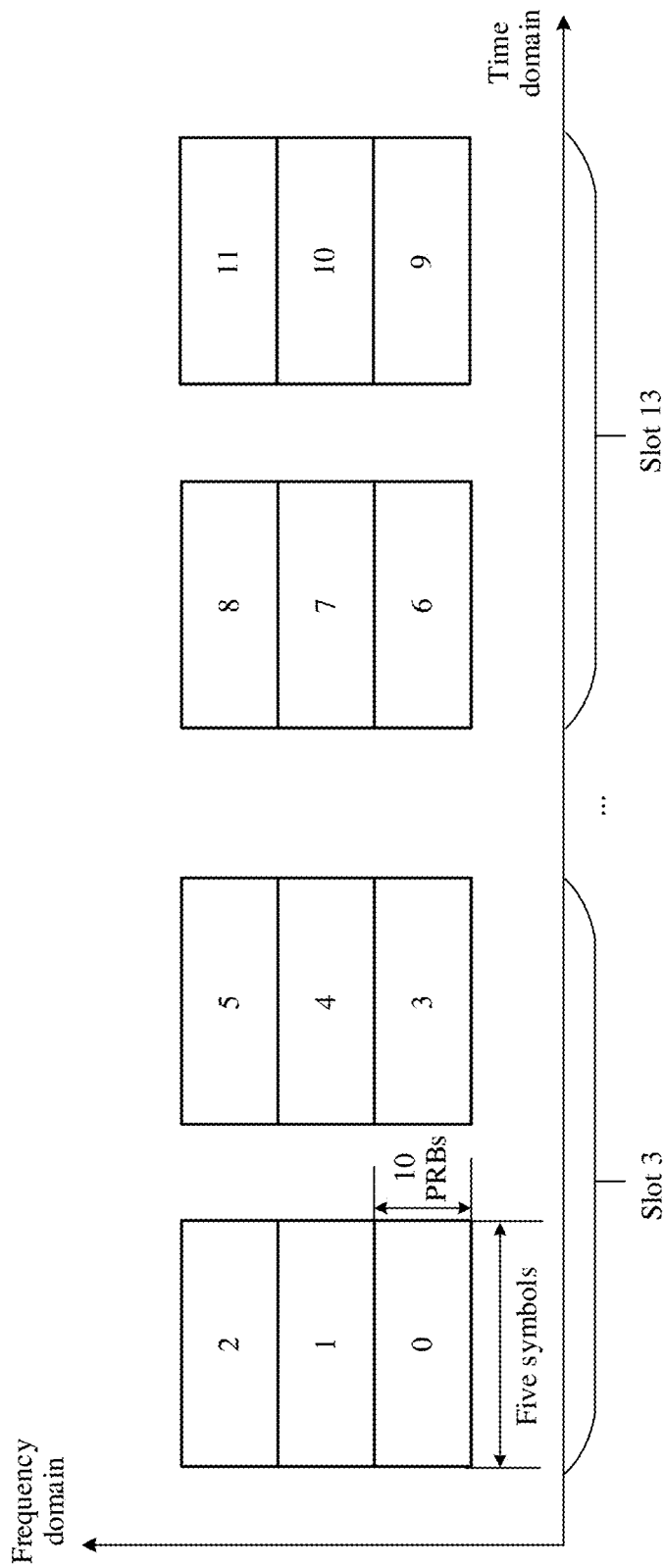

In this way, the first sequence and the index of each PUSCH resource unit in the first sequence is obtained by performing the foregoing A, C, and D. FIG. 7b shows an index of each PUSCH resource unit. The index of each PUSCH resource unit is indexes of four PUSCH occasions included in each PUSCH resource unit.

Example 3

In Example 3, one PUSCH resource unit includes two PUSCH occasions, the two PUSCH occasions respectively correspond to two PUSCH resource blocks, and the two PUSCH resource blocks are located in a same slot and have a same frequency domain resource. For ease of description, the two PUSCH resource blocks are referred to as a PUSCH resource block group. Further, indexes of DMRS ports and indexes of DMRS sequences associated with the two PUSCH occasions are the same. For example, PUSCH resource unit 0 includes PUSCH occasion 01 and PUSCH occasion 02. PUSCH occasion 01 corresponds to the bottommost resource block in the lower left corner of FIG. 7c, and PUSCH occasion 01 is associated with DMRS port 0 and DMRS sequence 0. PUSCH occasion 02 corresponds to the bottommost resource block in the middle column of FIG. 7c, and PUSCH occasion 02 is associated with DMRS port 0 and DMRS sequence 0.

In this case, P=24. The DMRS port associated with the PUSCH resource unit is the DMRS port associated with the two PUSCH occasions, and the DMRS sequence associated with the PUSCH resource unit is the DMRS sequence associated with the two PUSCH occasions.

Sorting the plurality of PUSCH resource units includes the following operations:

A. For PUSCH resource units multiplexed in frequency domain, the PUSCH resource units are sorted in ascending order of indexes of frequency domain resources of the PUSCH resource units.

B. ① For PUSCH resource units corresponding to a same PUSCH resource block group, the PUSCH resource units are sorted based on indexes of DMRS resources associated with the PUSCH resource units. Sorting based on the indexes of the DMRS resources associated with the PUSCH resource units refers to: first sorting in ascending order of indexes of DMRS ports associated with the PUSCH resource units, and then sorting in ascending order of indexes of DMRS sequences associated with the PUSCH resource units. ② Alternatively, for PUSCH resource units corresponding to a same PUSCH resource block group, the PUSCH resource units are sorted in ascending order of indexes of DMRS ports associated with the PUSCH resource units. ③ Alternatively, for PUSCH resource units corresponding to a same PUSCH resource block group, the PUSCH resource units are sorted in ascending order of indexes of DMRS sequences associated with the PUSCH resource units. In this example, ① in B is used as an example for description.

D. For PUSCH resource units in different slots, the PUSCH resource units are sorted in ascending order of indexes of slots in which the PUSCH resource units are located.

Figure 7C:
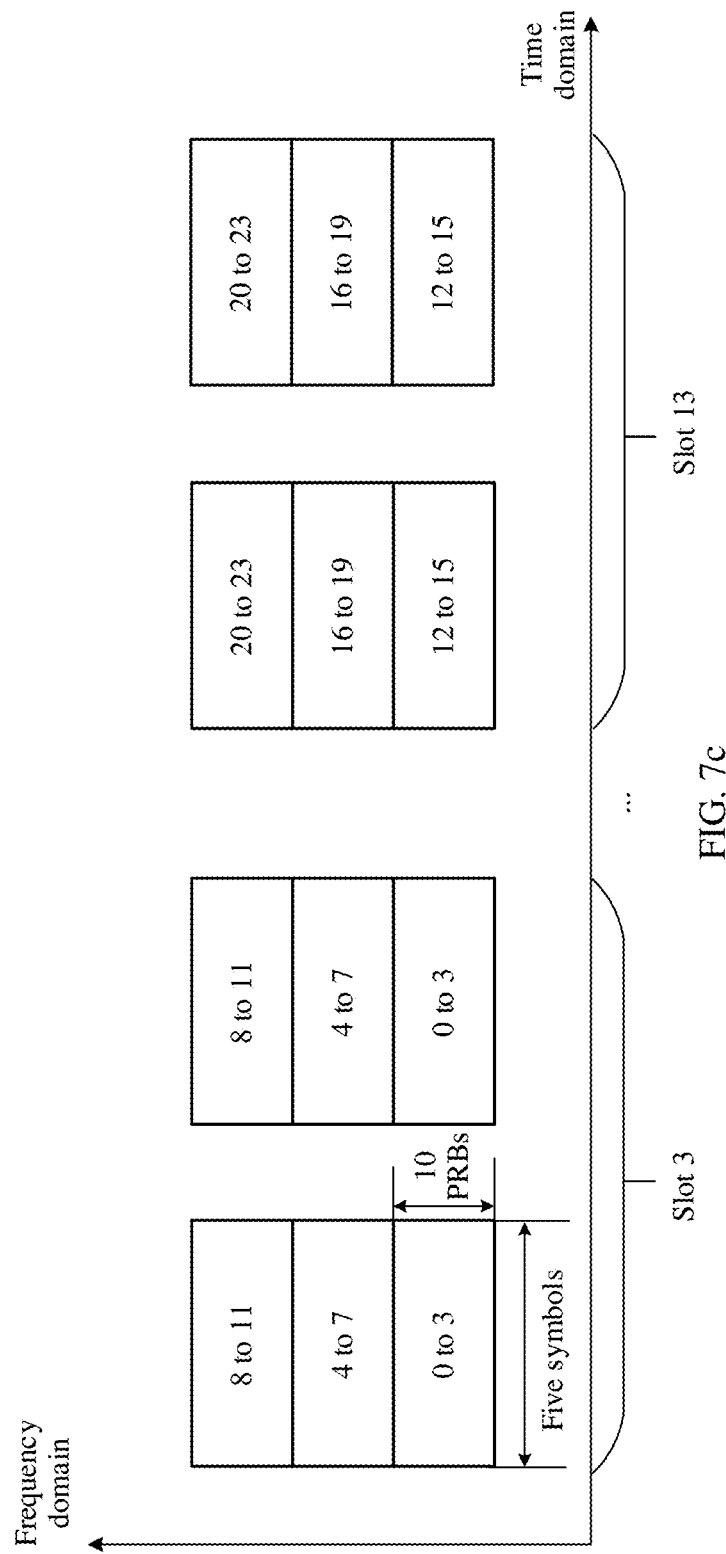

In this way, the first sequence and the index of each PUSCH resource unit in the first sequence is obtained by performing the foregoing A, B, and D. FIG. 7c shows an index of each PUSCH resource unit. The index of each PUSCH resource unit is indexes of two PUSCH occasions included in each PUSCH resource unit.

Example 4

In Example 4, one PUSCH resource unit includes eight transmission occasions corresponding to a same PUSCH resource block group, and each PUSCH resource block group includes two PUSCH resource blocks located in a same slot and having a same frequency domain resource. In this case, P=6.

Sorting the plurality of PUSCH resource units includes the following operations:

A. For PUSCH resource units multiplexed in frequency domain, the PUSCH resource units are sorted in ascending order of indexes of frequency domain resources of the PUSCH resource units.

D. The PUSCH resource units are sorted in ascending order of indexes of slots in which the PUSCH resource units are located.

Figure 7D:
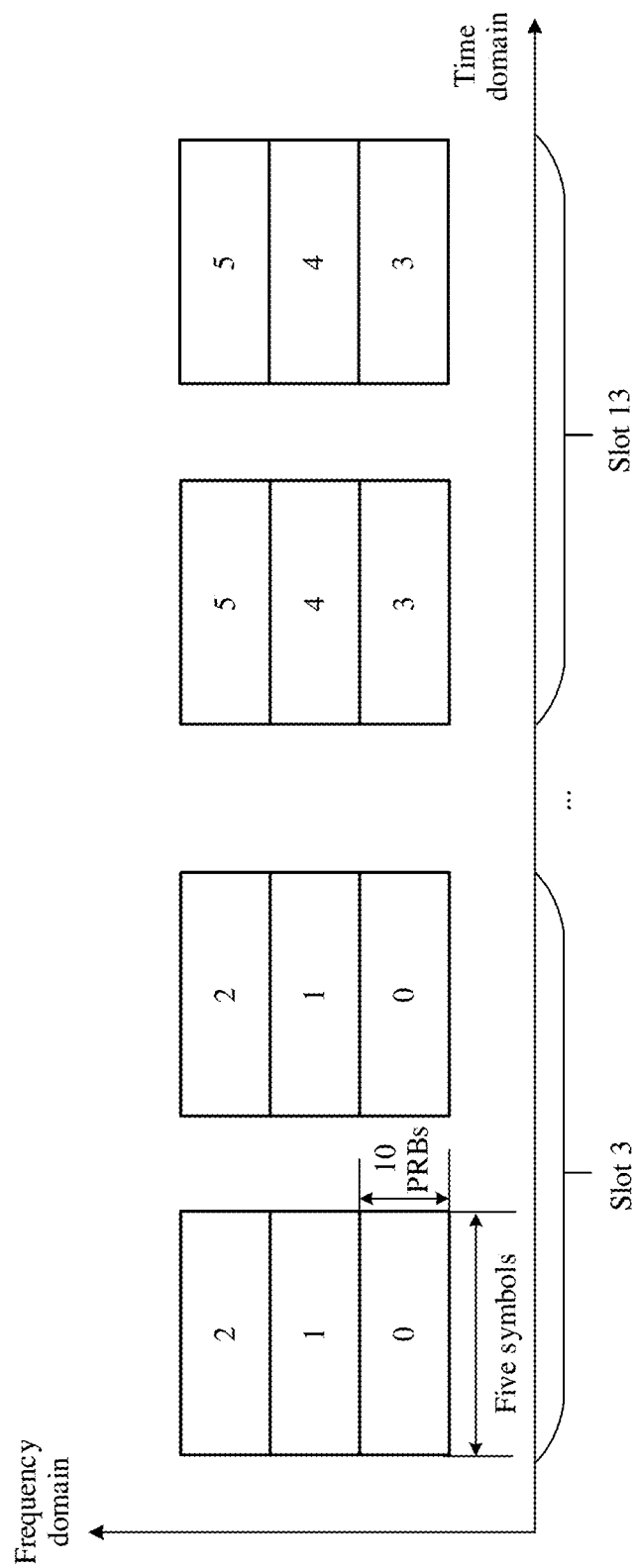

In this way, the first sequence and the index of each PUSCH resource unit in the first sequence is obtained by performing the foregoing A and D. FIG. 7d shows an index of each PUSCH resource unit. The index of each PUSCH resource unit is indexes of eight PUSCH occasions included in each PUSCH resource unit.

Example 5

In Example 5, one PUSCH resource unit includes three PUSCH occasions, the three PUSCH occasions respectively correspond to three PUSCH resource blocks, and the three PUSCH resource blocks have a same time domain resource and different frequency domain resources. For ease of description, the two PUSCH resource blocks are referred to as a PUSCH resource block group. Further, indexes of DMRS ports and indexes of DMRS sequences associated with the three PUSCH occasions are the same. In this case, P=16.

Sorting the plurality of PUSCH resource units includes the following operations:

B. ① For PUSCH resource units corresponding to a same PUSCH resource block group, the PUSCH resource units are sorted based on indexes of DMRS resources associated with the PUSCH resource units. Sorting based on the indexes of the DMRS resources associated with the PUSCH resource units refers to: first sorting in ascending order of indexes of DMRS ports associated with the PUSCH resource units, and then sorting in ascending order of indexes of DMRS sequences associated with the PUSCH resource units. ② Alternatively, for PUSCH resource units corresponding to a same PUSCH resource block group, the PUSCH resource units are sorted in ascending order of indexes of DMRS ports associated with the PUSCH resource units. ③ Alternatively, for PUSCH resource units corresponding to a same PUSCH resource block group, the PUSCH resource units are sorted in ascending order of indexes of DMRS sequences associated with the PUSCH resource units. In this example, ① in B is used as an example for description.

C. For PUSCH resource units that are multiplexed in time domain and that are in a same slot, the PUSCH resource units are sorted in ascending order of indexes of time domain resources of the PUSCH resource units.

D. For PUSCH resource units in different slots, the PUSCH resource units are sorted in ascending order of indexes of slots in which the PUSCH resource units are located.

Figure 7E:
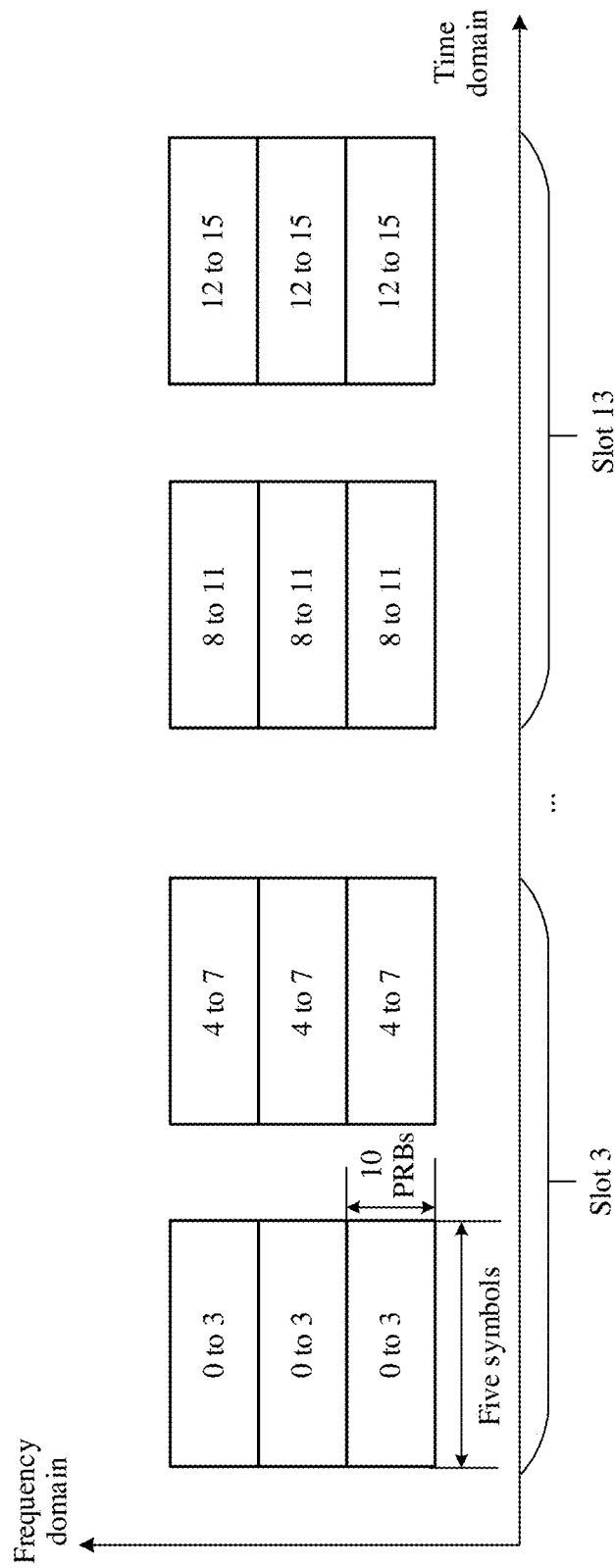

In this way, the first sequence and the index of each PUSCH resource unit in the first sequence is obtained by performing the foregoing B, C, and D. FIG. 7e shows an index of each PUSCH resource unit. The index of each PUSCH resource unit is indexes of three PUSCH occasions included in each PUSCH resource unit.

Example 6

In Example 6, one PUSCH resource unit includes twelve transmission occasions corresponding to a same PUSCH resource block group, and each PUSCH resource block group includes three PUSCH resource blocks having a same time domain resource and different frequency domain resources. In this case, P=4.

Sorting the plurality of PUSCH resource units includes the following operations:

C. For PUSCH resource units that are multiplexed in time domain and that are in a same slot, the PUSCH resource units are sorted in ascending order of indexes of time domain resources of the PUSCH resource units.

D. For PUSCH resource units in different slots, the PUSCH resource units are sorted in ascending order of indexes of slots in which the PUSCH resource units are located.

Figure 7F:
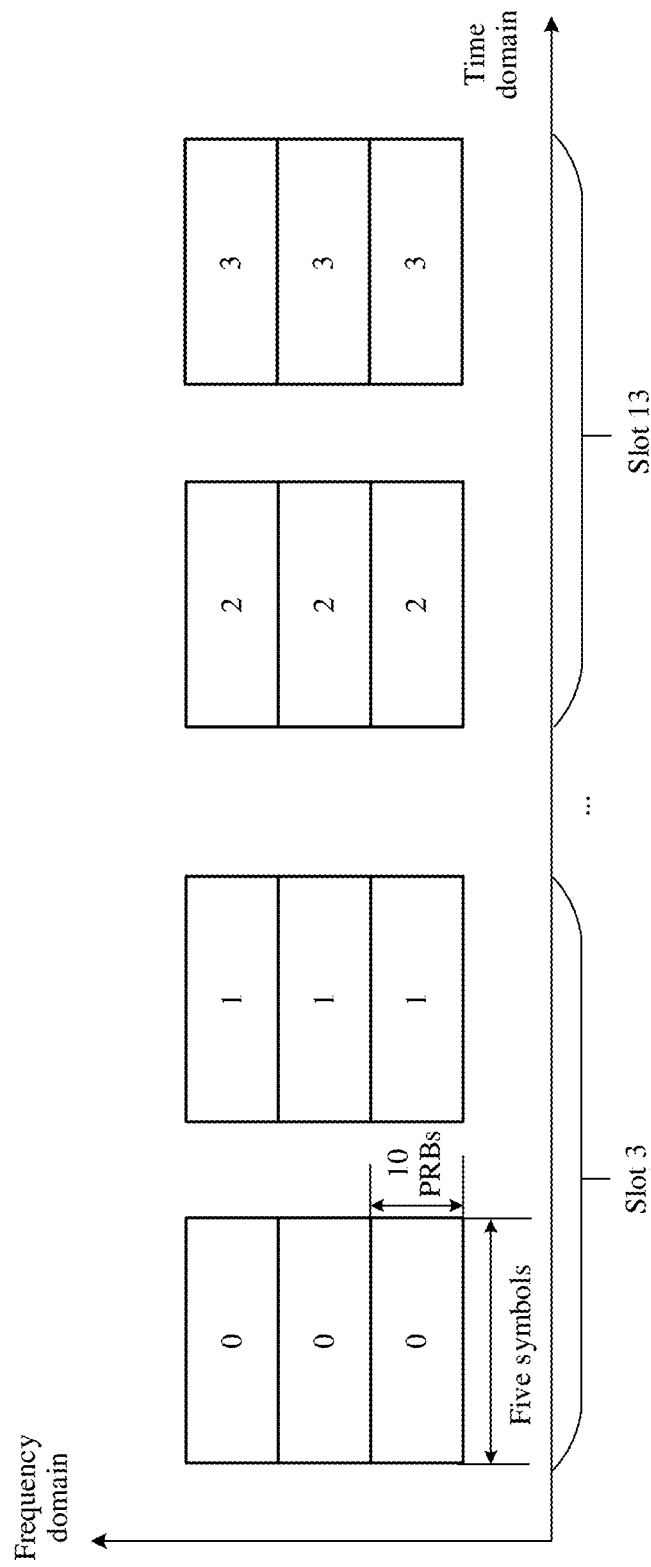

In this way, the first sequence and the index of each PUSCH resource unit in the first sequence is obtained by performing the foregoing C and D. FIG. 7f shows an index of each PUSCH resource unit. The index of each PUSCH resource unit is indexes of twelve PUSCH occasions included in each PUSCH resource unit.

(2) Determine the correspondence between the M SSBs and the N PUSCH occasions based on the indexes of the M SSBs and the indexes of the N PUSCH occasions.

For example, the terminal device determines the correspondence between M SSBs and N PUSCH occasions based on a preset rule. For example, the preset rule is that an index of an SSB and an index of a PUSCH occasion corresponding to the SSB comply with a preset relational expression. For example, the index of the SSB and the index of the PUSCH occasion corresponding to the SSB comply with the following relational expression:

$Y \bmod M = X$, where

X is the index of the SSB, and Y is the index of the PUSCH occasion corresponding to the SSB.

For example, M=3. in some embodiments, based on the relational expression that indexes of PUSCH occasions corresponding to SSB #0 are 0, 3, 6, . . . ; indexes of PUSCH occasions corresponding to SSB #1 are 1, 4, 7, . . . ; and indexes of PUSCH occasions corresponding to SSB #2 are 2, 5, 8, . . . are learned.

Step 604: The terminal device determines, based on an index of a first SSB and the correspondence between the M SSBs and the N PUSCH occasions, at least one PUSCH occasion corresponding to the first SSB. The at least one PUSCH occasion corresponding to the first SSB includes a first PUSCH occasion.

For example, in response to the terminal device being in an idle mode or an inactive mode and needs to send uplink information, the terminal device selects, from the M SSBs based on measurement values of the M SSBs, an SSB whose measurement value is greater than or equal to a first preset threshold, or select an SSB with a largest measurement value from the M SSBs. The first preset threshold is set based on an demand. This is not limited. For example, the first SSB is the selected SSB. In this case, the terminal device determines, based on an index of the first SSB and the correspondence between the M SSBs and the N PUSCH occasions, at least one PUSCH occasion corresponding to the first SSB. The measurement value of the SSB includes reference signal received power (RSRP) and/or reference signal received quality (RSRQ).

Step 605: The terminal device sends uplink information to the network device on a beam corresponding to the first SSB by using the first PUSCH occasion.

For example, in response to the first PUSCH occasion corresponding to PUSCH resource block 0, and is associated with DMRS port 0 and DMRS sequence 0, that the terminal device sends the uplink information by using the first PUSCH occasion means that the terminal device sends the uplink information on PUSCH resource block 0, and sends, by using DMRS port 0, a DMRS corresponding to the uplink information (in other words, maps DMRS sequence 0 to an RE corresponding to DMRS port 0 and sends the RE). The uplink information includes uplink data and/or uplink signaling. The uplink signaling is RRC signaling, for example, an RRC connection resume request message.

Correspondingly, in step 606, the network device receives the uplink information from the first PUSCH occasion.

Step 607: The network device sends downlink information on the beam corresponding to the first SSB to the terminal device.

Herein, after receiving the uplink information from the first PUSCH occasion, the network device determines, based on the correspondence between the M SSBs and the N PUSCH occasions, an SSB (for example, the first SSB) corresponding to the first PUSCH occasion, and further sends downlink information (for example, a CG response message) to the terminal device based on a spatial transmission parameter of the first SSB. For a manner in which the network device determines the M SSBs and the N PUSCH occasions, refer to the foregoing manner in which the terminal device determines the M SSBs and the N PUSCH occasions.

In an example, in response to the uplink information sent by the terminal device in step 605 being uplink data, the downlink information sent by the network device in step 607 is feedback information indicating that the uplink data is successfully transmitted. The feedback information includes a HARQ acknowledgment (ACK) and/or timing advance information. Alternatively, the downlink information sent by the network device is a negative acknowledgment (NACK) or a rescheduling indication (for example, downlink control information (DCI)), indicating that uplink data transmission fails and that the uplink data needs to be retransmitted. in response to the uplink information sent by the terminal device in step 605 being uplink signaling (for example, an RRC connection resume request message), the downlink information in step 607 is downlink signaling (for example, an RRC connection release message or an RRC connection resume message).

Correspondingly, in step 608, the terminal device receives the downlink information from the network device on the beam corresponding to the first SSB.

For step 607 and step 608, the network device first sends a PDCCH to the terminal device, where the PDCCH is used to schedule a physical downlink shared channel (PDSCH) (where downlink information is carried on the PDSCH); and a DMRS of the PDCCH and the first SSB satisfy QCL. Therefore, the terminal device receives the DMRS of the PDCCH based on a spatial reception parameter of the first SSB, obtain, by parsing the PDCCH, a time-frequency resource occupied by the PDSCH, and receive the PDSCH on the time-frequency resource, to obtain first information.

In some embodiments, in a cell with a beam operation, a correspondence between a plurality of SSBs and a plurality of PUSCH occasions is configured, so that in response to the terminal device having a call for sending uplink information, the terminal device selects one SSB from the plurality of SSBs, send the uplink information by using a PUSCH occasion corresponding to the SSB, and receive, based on a spatial reception parameter of the SSB, downlink information sent by the network device, to implement information transmission between the terminal device in an idle mode or an inactive mode and the network device. For a data packet that has a small data volume and is not frequently transmitted, data transmission efficiency is effectively improved, and power consumption and signaling overheads are reduced. In addition, a serving SSB does not need to be maintained between the terminal device and the network device, and this has high flexibility.

In some embodiments, implementation of the communication method is described.

Figure 8:
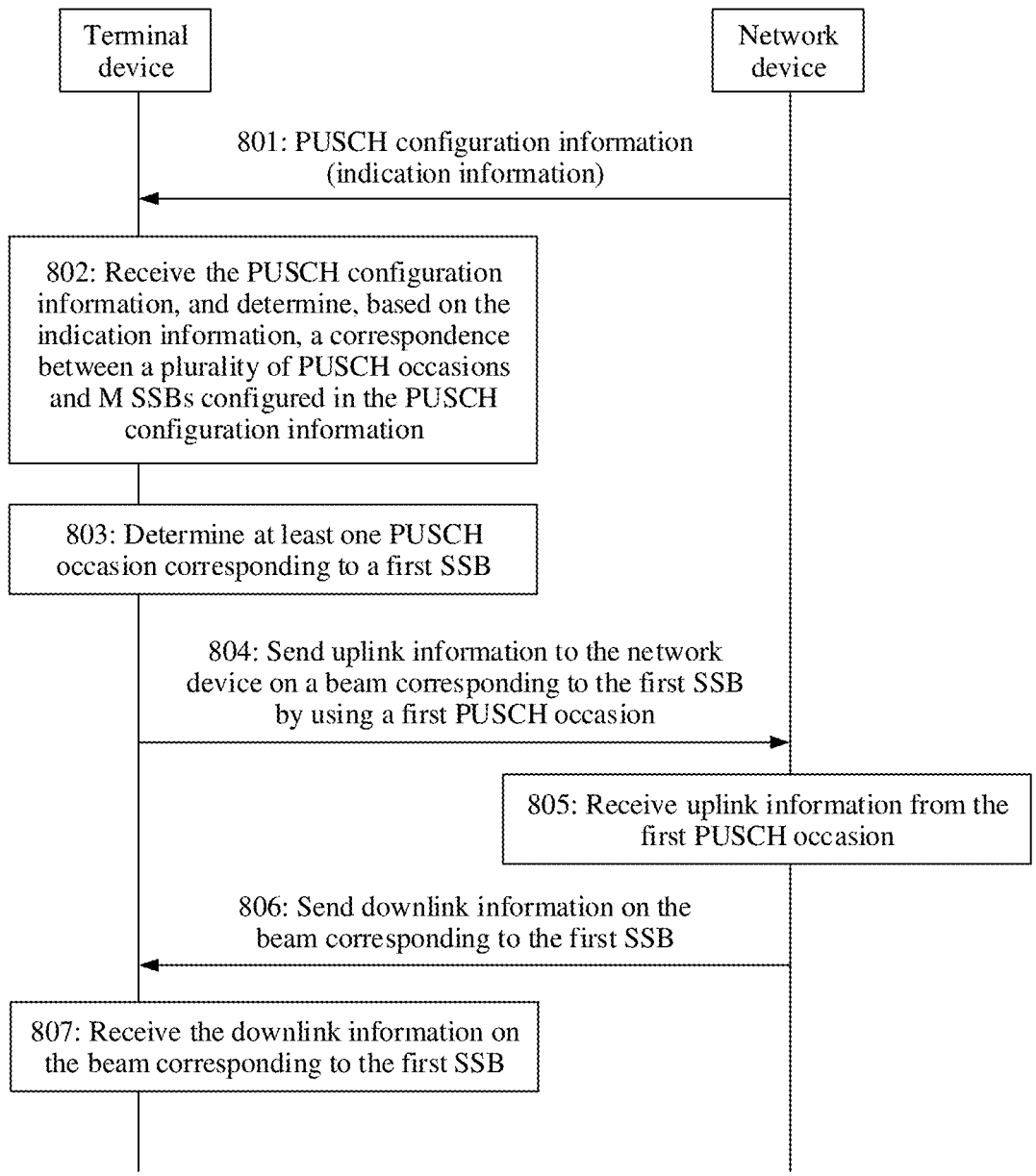
FIG. 8 is a schematic flowchart corresponding to a communication method in accordance with some embodiments.

FIG. 8 is a schematic flowchart corresponding to the communication method in accordance with some embodiments. As shown in FIG. 8, the method includes the following steps.

Step 801: A network device sends PUSCH configuration information to a terminal device, where the PUSCH configuration information includes indication information, and the indication information indicates a correspondence between a plurality of PUSCH occasions and M SSBs configured in the PUSCH configuration information.

Correspondingly, in step 802, the terminal device receives the PUSCH configuration information, and determines, based on the indication information, the correspondence between the plurality of PUSCH occasions and the M SSBs configured in the PUSCH configuration information. For descriptions of the M SSBs, refer to the above description. Details are not described herein again.

In some embodiments, there is a plurality of implementations in which the indication information indicates the correspondence between the plurality of PUSCH occasions and the M SSBs configured in the PUSCH configuration information.

In some embodiments, the PUSCH configuration information includes a plurality of sets of PUSCH configuration information, and each set of PUSCH configuration information is used to configure a plurality of PUSCH occasions. Each set of PUSCH configuration information includes at least one of time domain resource configuration information, frequency domain resource configuration information, and DMRS configuration information. Further, each set of PUSCH configuration information further includes indication information a. The indication information a indicates an SSB corresponding to a plurality of PUSCH occasions configured in each set of PUSCH configuration information. For example, the indication information includes an index of the SSB corresponding to the plurality of PUSCH occasions configured in each set of PUSCH configuration information.

For example, the plurality of sets of PUSCH configuration information include PUSCH configuration information 0, PUSCH configuration information 1, and PUSCH configuration information 2. The PUSCH configuration information 0 includes an index of SSB #0, the PUSCH configuration information 1 includes an index of SSB #1, and the PUSCH configuration information 2 includes an index of SSB #2. Further, the terminal device learns that an SSB corresponding to a PUSCH occasion configured in the PUSCH configuration information 0 is SSB #0 (or a PUSCH occasion corresponding to SSB #0 is the PUSCH occasion configured in the PUSCH configuration information 0), an SSB corresponding to a PUSCH occasion configured in the PUSCH configuration information 1 is SSB #1, and an SSB corresponding to a PUSCH occasion configured in the PUSCH configuration information 2 is SSB #2.

In some embodiments, the plurality of PUSCH occasions corresponding to the M SSBs are valid PUSCH occasions.

Step 803: The terminal device determines, based on an index of a first SSB and the correspondence that is between the M SSBs and the plurality of PUSCH occasions and that is indicated by the network device, at least one PUSCH occasion corresponding to the first SSB. The at least one PUSCH occasion corresponding to the first SSB includes a first PUSCH occasion.

Step 804: The terminal device sends uplink information on a beam corresponding to the first SSB by using the first PUSCH occasion.

Correspondingly, in step 805, the network device receives the uplink information from the first PUSCH occasion.

Step 806: The network device sends downlink information on the beam corresponding to the first SSB to the terminal device.

Correspondingly, in step 807, the terminal device receives the downlink information on the beam corresponding to the first SSB.

In some embodiments, in a cell with a beam operation, the network device indicates, to the terminal device, a correspondence between a plurality of SSBs and a plurality of PUSCH occasions, so that in response to the terminal device having a call for sending uplink information, the terminal device selects one SSB from the plurality of SSBs, send the uplink information by using a PUSCH occasion corresponding to the SSB, and receive, based on a spatial reception parameter of the SSB, downlink information sent by the network device, to implement information transmission between the terminal device in an idle mode or an inactive mode and the network device. For a data packet that has a small data volume and is not frequently transmitted, data transmission efficiency is effectively improved, and power consumption and signaling overheads are reduced. In addition, the network device indicates the correspondence between the plurality of SSBs and the plurality of PUSCH occasions to the terminal device. In comparison with a case in which the terminal device determines the correspondence between the plurality of SSBs and the plurality of PUSCH occasions, processing load of the terminal device is effectively reduced. Moreover, a serving SSB does not need to be maintained between the terminal device and the network device, and flexibility is high.

In some embodiments, the communication method is described.

Figure 9:
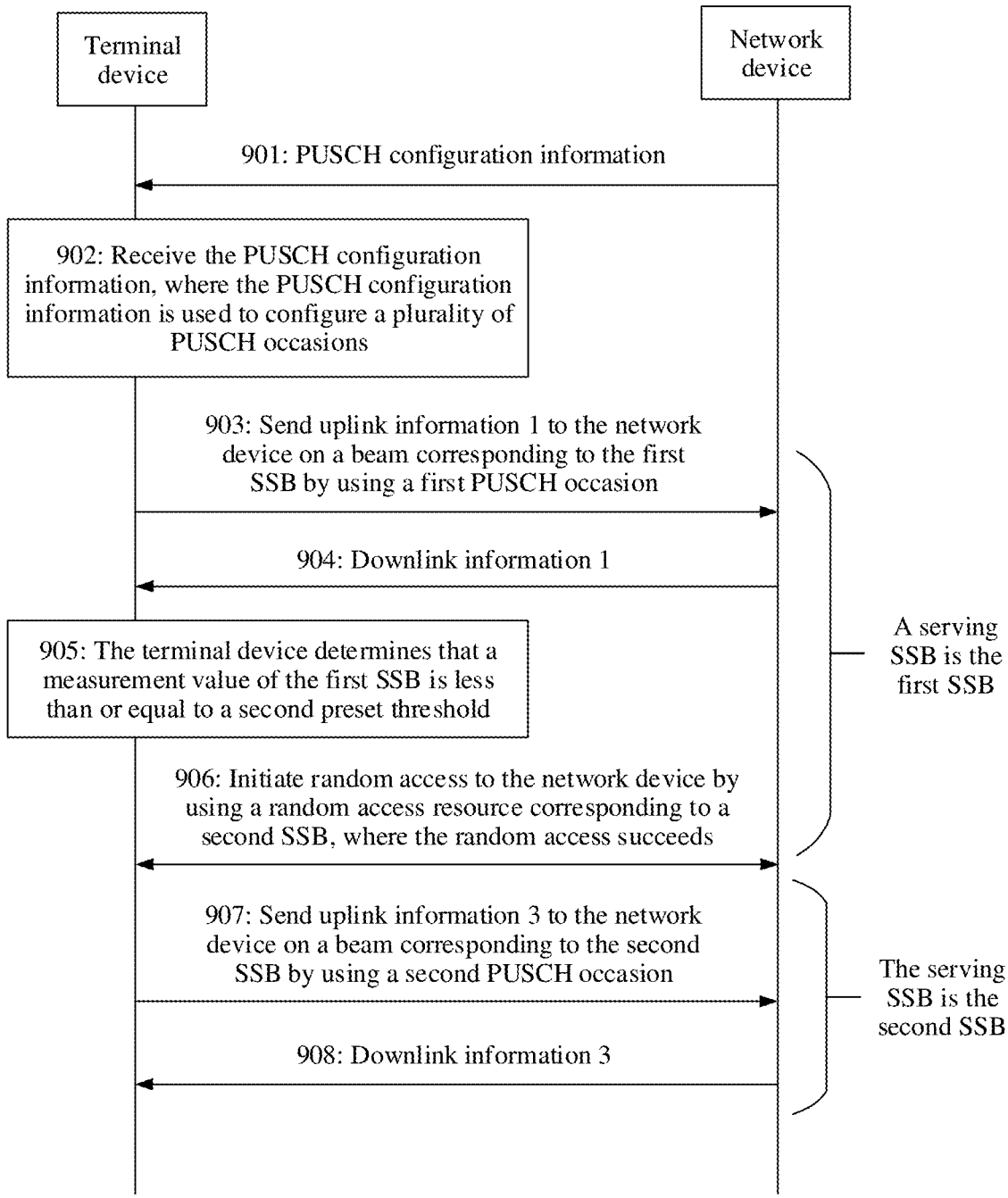
FIG. 9 is a schematic flowchart corresponding to a communication method in accordance with some embodiments.

FIG. 9 is a schematic flowchart corresponding to the communication method in accordance with some embodiments. As shown in FIG. 9, the method includes the following steps.

Step 901: A network device sends PUSCH configuration information to a terminal device.

Correspondingly, in step 902, the terminal device receives the PUSCH configuration information, where the PUSCH configuration information is used to configure a plurality of PUSCH occasions, and the plurality of PUSCH occasions include a first PUSCH occasion and a second PUSCH occasion.

For example, the terminal device in step 901 and step 902 is in a connected mode, or is in an idle mode or an inactive mode.

For example, the terminal device is in the connected mode. in response to the terminal device receiving, by using the first SSB, a PDCCH sent by the network device, the first SSB is understood as a serving SSB between the terminal device and the network device. Further, after entering the idle mode or the inactive mode from the connected mode, the terminal device continues to maintain the serving SSB, and communicates with the network device based on the serving SSB (for example, perform step 903 and step 904).

Step 903: The terminal device sends uplink information 1 to the network device on a beam corresponding to the first SSB by using the first PUSCH occasion; and correspondingly, the network device receives the uplink information 1 from the first PUSCH occasion on the beam corresponding to the first SSB.

Step 904: The network device sends downlink information 1 to the terminal device on the beam corresponding to the first SSB; and correspondingly, the terminal device receives, on the beam corresponding to the first SSB, the downlink information 1 sent by the network device.

Step 905: The terminal device determines that a measurement value of the first SSB is less than or equal to a second preset threshold.

Step 906: The terminal device initiates random access to the network device by using a random access resource corresponding to a second SSB, where the random access succeeds.

For example, the terminal device periodically receives a plurality of SSBs (for example, including the first SSB and the second SSB) and perform measurement. in response to a determination that the measurement value of the first SSB is less than or equal to the second preset threshold, that indicates receiving the downlink information based on the spatial reception parameter of the first SSB fails. In this case, the serving SSB is switched. The terminal device selects, from the plurality of SSBs, an SSB whose measurement value is greater than or equal to the second preset threshold, for example, the second SSB, and initiates a random access procedure to the network device by using a random access resource corresponding to the second SSB. The random access procedure notifies the network device to switch the serving SSB from the first SSB to the second SSB. The second preset threshold is set based on an demand. This is not limited.

The random access procedure herein is a four-step random access procedure or a two-step random access procedure. in response to the random access procedure being a four-step random access procedure, the terminal device receives, based on a spatial reception parameter of the second SSB, a message 2 and/or a message 4 sent by the network device. in response to the random access procedure being a two-step random access procedure, the terminal device receives, based on a spatial reception parameter of the second SSB, a message B sent by the network device.

Further, the terminal device further sends uplink information (for example, uplink information 2) to the network device and receive downlink information (for example, downlink information 2) in the random access procedure. For details, refer to the foregoing descriptions.

Step 907: The terminal device sends uplink information 3 to the network device on a beam corresponding to the second SSB by using the second PUSCH occasion; and correspondingly, the network device receives the uplink information 3 from the second PUSCH occasion on the beam corresponding to the second SSB.

Step 908: The network device sends downlink information 3 to the terminal device on the beam corresponding to the second SSB; and correspondingly, the terminal device receives, on the beam corresponding to the second SSB, the downlink information 3 sent by the network device.

In some embodiments, in a cell with a beam operation, a serving SSB is maintained between the terminal device and the network device, so that the terminal device in the idle mode or the inactive mode sends uplink information on a beam corresponding to the serving SSB by using a preconfigured PUSCH occasion, and receive, on the beam corresponding to the serving SSB, downlink information sent by the network device. For a data packet that has a small data volume and is not frequently transmitted, data transmission efficiency is effectively improved, and power consumption and signaling overheads are reduced. Because the serving SSB is maintained between the terminal device and the network device, there is no need to set a correspondence between a plurality of SSBs and a plurality of PUSCH occasions, so that the terminal device flexibly selects a PUSCH occasion in response to sending uplink information by using the PUSCH occasion. Further, in response to a measurement value of the serving SSB being less than or equal to the second preset threshold, the terminal device initiates the random access procedure to notify the network device to change the serving SSB, to effectively ensure transmission reliability.

In some embodiments, (1) from different perspectives for a cell with a beam operation, solutions in which a terminal device performs uplink transmission in an idle mode or an inactive mode. Some embodiments, focus on differences among the embodiments. For content other than the differences, the embodiments are cross-referenced.

(2) Some embodiments are separately implemented, or are implemented in combination. For example, in response to some embodiments being implemented in combination, a serving SSB is maintained between the terminal device and the network device. In response to the terminal device having a call for sending uplink information, the terminal device determines, based on a correspondence between M SSBs and N PUSCH occasions, a PUSCH occasion corresponding to the serving SSB, and send the uplink information by using the PUSCH occasion corresponding to the serving SSB.

(3) Step numbers in the flowcharts described in some embodiments are an example of an execution procedure, and do not constitute a limitation on an execution sequence of the steps. In some embodiments, there is no strict execution sequence between steps that do not have a time sequence dependency relationship with each other. In addition, not all the steps shown in the flowcharts are requisite steps, and some steps are added to or deleted from the flowcharts according to an demand.

The foregoing mainly describes the solutions provided in the embodiments from a perspective of interaction between a network device and a terminal device. In some embodiments, to implement the foregoing functions, the network device or the terminal device includes a corresponding hardware structure and/or a software module for performing each function. A person skilled in the art is aware that, in combination with units and algorithm steps of the examples described in embodiments, the embodiments are implemented by hardware or a combination of hardware and computer software. Whether a function is performed by hardware or hardware driven by computer software depends on particular applications and design constraints of the technical solutions. A person skilled in the art is able to use different methods to implement the described functions for each particular application, but implementation beyond the scope of the embodiments is unrealistic.

In some embodiments, division into functional units are performed on the terminal device and the network device based on the foregoing method examples. For example, division into each functional unit is based on each corresponding function, or two or more functions are integrated into one unit. The integrated unit is implemented in a form of hardware, or is implemented in a form of a software functional unit.

Figure 10:
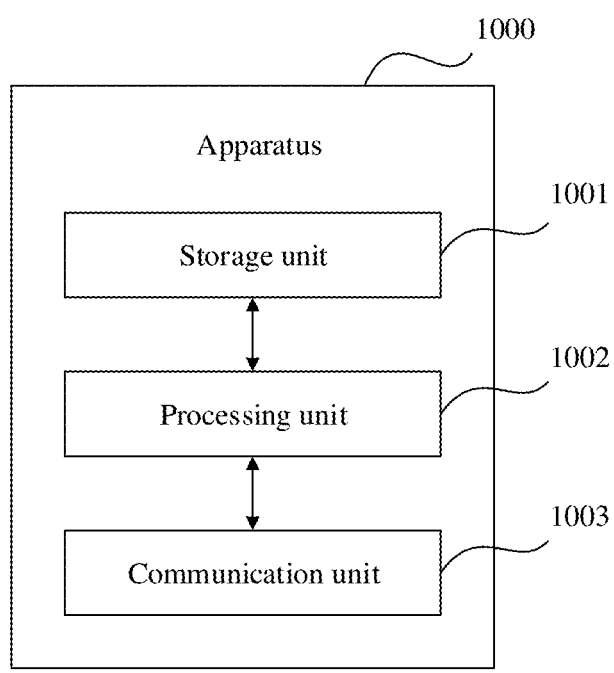
FIG. 10 is a possible schematic block diagram of an apparatus in accordance with some embodiments.

In response to the integrated unit being used, FIG. 10 is a possible example block diagram of an apparatus in accordance with some embodiments. As shown in FIG. 10, an apparatus 1000 includes a processing unit 1002 and a communication unit 1003. The processing unit 1002 is configured to control and manage an action of the apparatus 1000. The communication unit 1003 is configured to support communication between the apparatus 1000 and another device. Optionally, the communication unit 1003 is further referred to as a transceiver unit, and includes a receiving unit and/or a sending unit, respectively configured to perform a receiving operation and a sending operation. The apparatus 1000 further includes a storage unit 1001 that is configured to store program code and/or data of the apparatus 1000.

The apparatus 1000 is the terminal device in any one of the foregoing embodiments, or is a chip disposed in the terminal device. The processing unit 1002 supports the apparatus 1000 in performing actions of the terminal device in the foregoing method examples. Alternatively, the processing unit 1002 mainly performs an internal action of the terminal device in the method examples, and the communication unit 1003 supports communication between the apparatus 1000 and a network device. For example, the communication unit 1003 is configured to perform step 602, step 605, and step 608 in FIG. 6; and the processing unit 1002 is configured to perform step 603 and step 604 in FIG. 6.

In some embodiments, the communication unit 1003 is configured to receive a first SSB; the processing unit 1002 is configured to determine a PUSCH occasion corresponding to the first SSB; and the communication unit 1003 is further configured to send uplink information by using the PUSCH occasion.

In some embodiments, the communication unit 1003 is further configured to receive downlink information from a network device based on a spatial reception parameter of the first SSB.

In some embodiments, the processing unit 1002 is further configured to determine a correspondence between M SSBs and a plurality of PUSCH occasions, where the M SSBs include the first SSB, and M is a positive integer; and that the processing unit 1002 determines a PUSCH occasion corresponding to the first SSB includes: The processing unit 1002 determines, based on the correspondence between the M SSBs and the plurality of PUSCH occasions, the PUSCH occasion corresponding to the first SSB.

In some embodiments, the PUSCH occasion includes a frequency domain resource; and the processing unit 1002 is configured to determine the correspondence between the M SSBs and the plurality of PUSCH occasions based on indexes of frequency domain resources of the plurality of PUSCH occasions.

In some embodiments, the PUSCH occasion includes a time domain resource; and the processing unit 1002 is configured to: determine the correspondence between the M SSBs and the plurality of PUSCH occasions based on indexes of slots in which the plurality of PUSCH occasions are located; or determine the correspondence between the M SSBs and the plurality of PUSCH occasions based on indexes of time domain resources of the plurality of PUSCH occasions and indexes of slots in which the plurality of PUSCH occasions are located.

In some embodiments, the PUSCH occasion is associated with a DMRS resource, and the DMRS resource includes DMRS port information and/or DMRS sequence information; and the processing unit 1002 is configured to determine the correspondence between the M SSBs and the plurality of PUSCH occasions further based on DMRS resources associated with the plurality of PUSCH occasions.

In some embodiments, the communication unit 1003 is further configured to receive first indication information from the network device, where the first indication information indicates the correspondence between the M SSBs and the plurality of PUSCH occasions.

In some embodiments, the plurality of PUSCH transmission occasions are in a preset time period.

In some embodiments, a start position of the preset time period is a start position of a reference radio frame; and the communication unit 1003 further configured to receive second indication information from the network device, where the second indication information indicates the reference radio frame.

In some embodiments, the communication unit 1003 is further configured to receive configuration information, where the configuration information is used to configure a plurality of PUSCH occasions.

In some embodiments, the processing unit 1002 is further configured to: select, from the M SSBs based on measurement values of the M SSBs, a first SSB whose measurement value is greater than or equal to a preset threshold.

The apparatus 1000 is the network device in any one of the foregoing embodiments, or is a chip disposed in the network device. The processing unit 1002 supports the apparatus 1000 in performing actions of the network device in the foregoing method examples. Alternatively, the processing unit 1002 mainly performs an internal action of the network device in the method examples, and the communication unit 1003 supports communication between the apparatus 1000 and another device. For example, the communication unit 1003 is configured to perform step 601, step 606, and step 607 in FIG. 6.

In some embodiments, the communication unit 1003 is configured to receive uplink information from a first PUSCH occasion; the processing unit 1002 is configured to determine a first SSB corresponding to the first PUSCH occasion; and the communication unit 1003 is further configured to send downlink information based on a spatial transmission parameter of the first SSB.

In some embodiments, the processing unit 1002 is further configured to determine a correspondence between M SSBs and a plurality of PUSCH occasions, where the plurality of PUSCH occasions include the first PUSCH occasion, and M is a positive integer; and that the processing unit 1002 determines a first SSB corresponding to the first PUSCH occasion includes: The processing unit 1002 determines, based on the correspondence between the M SSBs and the plurality of PUSCH occasions, the first SSB corresponding to the first PUSCH occasion.

In some embodiments, the PUSCH occasion includes a frequency domain resource; and the processing unit 1002 is configured to determine the correspondence between the M SSBs and the plurality of PUSCH occasions based on indexes of frequency domain resources of the plurality of PUSCH occasions.

In some embodiments, the PUSCH occasion includes a time domain resource; and the processing unit 1002 is configured to: determine the correspondence between the M SSBs and the plurality of PUSCH occasions based on indexes of slots in which the plurality of PUSCH occasions are located; or determine the correspondence between the M SSBs and the plurality of PUSCH occasions based on indexes of time domain resources of the plurality of PUSCH occasions and indexes of slots in which the plurality of PUSCH occasions are located.

In some embodiments, the PUSCH occasion is associated with a DMRS resource, and the DMRS resource includes DMRS port information and/or DMRS sequence information; and the processing unit 1002 is configured to determine the correspondence between the M SSBs and the plurality of PUSCH occasions further based on DMRS resources associated with the plurality of PUSCH occasions.

In some embodiments, the communication unit 1003 is further configured to send first indication information, where the first indication information indicates the correspondence between the M SSBs and the plurality of PUSCH occasions, and the plurality of PUSCH occasions include the first PUSCH occasion.

In some embodiments, the plurality of PUSCH transmission occasions are in a preset time period.

In some embodiments, a start position of the preset time period is a start position of a reference radio frame; and the communication unit 1003 further configured to send second indication information, where the second indication information indicates the reference radio frame.

In some embodiments, the communication unit 1003 is further configured to send configuration information, where the configuration information is used to configure a plurality of PUSCH occasions.

In some embodiments, division of the foregoing apparatus into the units is logical function division. In some embodiments, all or some of the units are integrated into a physical entity, or are physically separate. In addition, all the units in the apparatus is implemented in a form of software invoked by a processing element, or is implemented in a form of hardware; or some units are implemented in a form of software invoked by a processing element, and some units are implemented in a form of hardware. For example, each unit is an independently disposed processing element, or is integrated into a chip of the apparatus for implementation. Alternatively, each unit is stored in a memory in a form of a program to be invoked by a processing element of the apparatus to perform a function of the unit. In addition, all or some of the units are integrated together, or are implemented independently. The processing element herein further is referred to as a processor, and is an integrated circuit having a signal processing capability. In some embodiments, the steps in the foregoing method or the foregoing units are implemented by using a hardware integrated logic circuit in the processor element, or are implemented in a form of software invoked by the processing element.

For example, a unit in any one of the foregoing apparatuses are one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, in response to the unit in the apparatus being implemented by scheduling a program by a processing element, the processing element is a processor, for example, a central processing unit (CPU) or another processor that invokes the program. For still another example, the units are integrated and implemented in a form of a system-on-a-chip (SOC).

The foregoing receiving unit is an interface circuit of the apparatus, and is configured to receive a signal from another apparatus. For example, in response to the apparatus being implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, in response to the apparatus being implemented in a manner of a chip, the sending unit is an interface circuit that is of the chip and that is configured to send a signal to another chip or apparatus.

Figure 11:
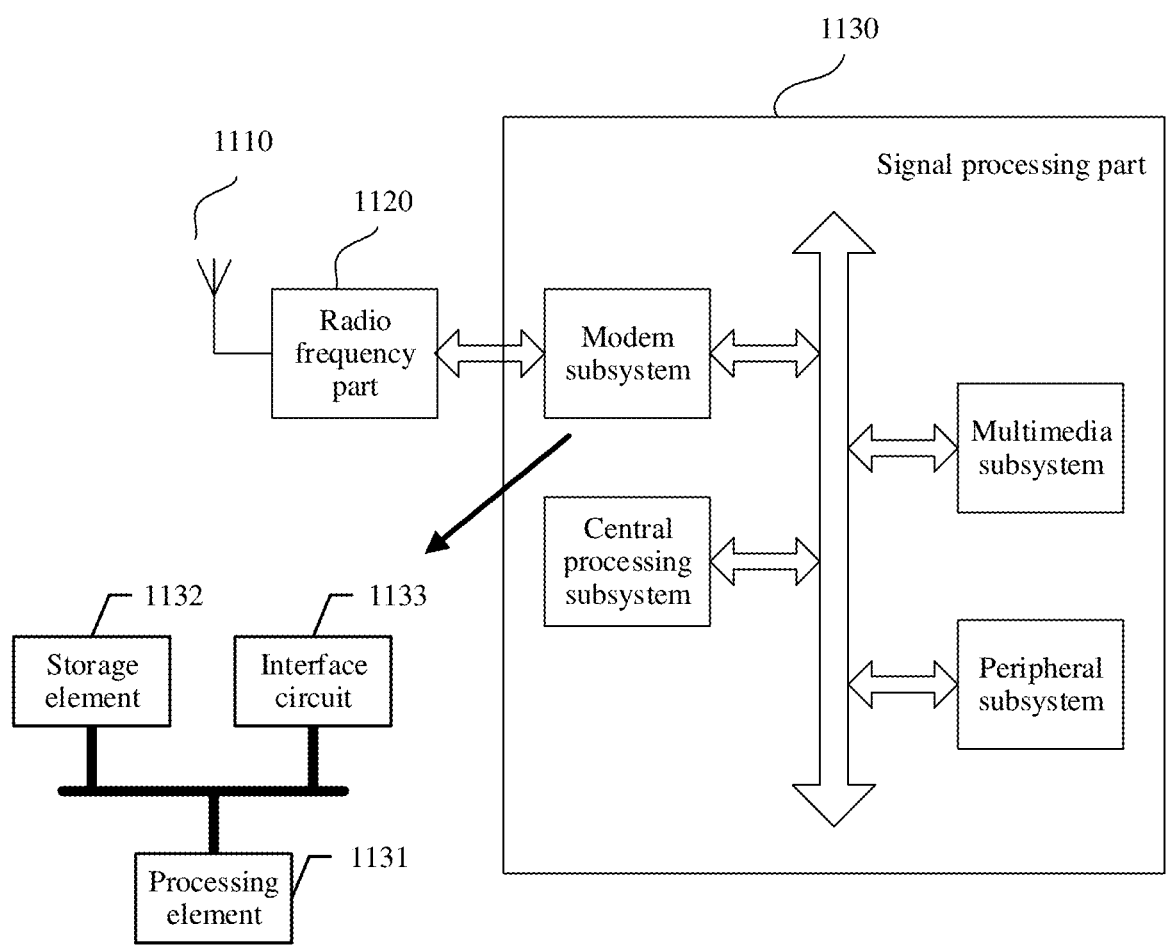
FIG. 11 is a schematic diagram of a structure of a terminal device in accordance with some embodiments.

FIG. 11 is a schematic diagram of a structure of a terminal device in accordance with some embodiments. The terminal device is the terminal device in the foregoing embodiments, and is configured to implement operations of the terminal device in the foregoing embodiments. As shown in FIG. 11, the terminal device includes an antenna 1110, a radio frequency part 1120, and a signal processing part 1130. The antenna 1110 is connected to the radio frequency part 1120. In a downlink direction, the radio frequency part 1120 receives, by using the antenna 1110, information sent by a network device; and sends, to the signal processing part 1130 for processing, the information sent by the network device. In an uplink direction, the signal processing part 1130 processes information of the terminal device, and sends the information of the terminal device to the radio frequency part 1120. The radio frequency part 1120 processes the information of the terminal device, and then sends processed information to the network device through the antenna 1110.

The signal processing part 1130 includes a modem subsystem, configured to process data at each communication protocol layer. The signal processing part 1130 further includes a central processing subsystem, configured to process an operating system and an application layer that are of the terminal device. In addition, the signal processing part 1130 further includes another subsystem, for example, a multimedia subsystem, or a peripheral subsystem. The multimedia subsystem is configured to control a camera or a screen display of the terminal device. The peripheral subsystem is configured to connect to another device. The modem subsystem is a chip that is separately disposed.

The modem subsystem includes one or more processing elements 1131, for example, include a main control CPU and another integrated circuit. In addition, the modem subsystem further includes a storage element 1132 and an interface circuit 1133. The storage element 1132 is configured to store data and a program. However, a program used to perform the methods performed by the terminal device in the foregoing methods is unable to be stored in the storage element 1132, but is stored in a memory outside the modem subsystem, and is loaded and used by the modem subsystem in response to being used. The interface circuit 1133 is configured to communicate with another subsystem.

The modem subsystem is implemented by a chip. The chip includes at least one processing element and an interface circuit. The processing element is configured to perform the steps of any method performed by the foregoing terminal device. The interface circuit is configured to communicate with another apparatus. In some embodiments, units in the terminal device for implementing the steps in the foregoing methods are implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element is a storage element located on a same chip as the processing element, namely, an on-chip storage element.

In some embodiments, a program used to perform the method performed by the terminal device in the foregoing methods are in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In some embodiments, units of the terminal device that implement the steps in the foregoing methods are configured as one or more processing elements. The processing elements are disposed in the modem subsystem. The processing element herein is an integrated circuit, for example, one or more ASICs, one or more DSPs, one or more FPGAs, or a combination of the types of integrated circuits. These integrated circuits are integrated together to form a chip.

Units of the terminal device that implement the steps in the foregoing methods are integrated together, and implemented in a form of an SOC. The SOC chip is configured to implement the foregoing methods. At least one processing element and storage element is integrated into the chip, and the processing element invokes a program stored in the storage element to implement the foregoing methods performed by the terminal device. Alternatively, at least one integrated circuit is integrated into the chip, to implement the foregoing methods performed by the terminal device. Alternatively, with reference to the foregoing embodiments, functions of some units are implemented by invoking a program by the processing element, and functions of some units are implemented by the integrated circuit.

In some embodiments, the foregoing apparatus used in the terminal device includes at least one processing element and an interface circuit. The at least one processing element is configured to perform any one of the methods that are provided in the foregoing method embodiments and performed by the terminal device. The processing element performs, in a first manner, by invoking the program stored in the storage element, some or all steps performed by the terminal device; or performs, in a second manner, by using a hardware integrated logic circuit in the processor element in combination with instructions, some or all steps performed by the terminal device; or certainly performs, by combining the first manner and the second manner, some or all steps performed by the terminal device.

The processing element herein is the same as that described above, and is implemented by using a processor. A function of the processing element is the same as a function of the processing unit described in FIG. 10. For example, the processing element is a general-purpose processor, for example, a CPU, or is one or more integrated circuits configured to implement the foregoing methods, for example, one or more ASICs, one or more microprocessors DSPs, or one or more FPGAs, or a combination of at least two of the integrated circuit forms. The storage element is implemented by using a memory. A function of the storage element is the same as a function of the storage unit described in FIG. 10. A function of the storage element is the same as a function of the storage unit described in FIG. 10. The storage element is one memory, or an umbrella term of a plurality of memories.

The terminal device shown in FIG. 11 implements the processes related to the terminal device in the method embodiments shown in FIG. 6, FIG. 8, or FIG. 9. Operations and/or functions of the modules in the terminal device shown in FIG. 11 are intended to implement the corresponding procedures in the foregoing method embodiments. For details, refer to the descriptions in the foregoing method embodiments. To avoid repetition, detailed descriptions are properly omitted herein.

Figure 12:
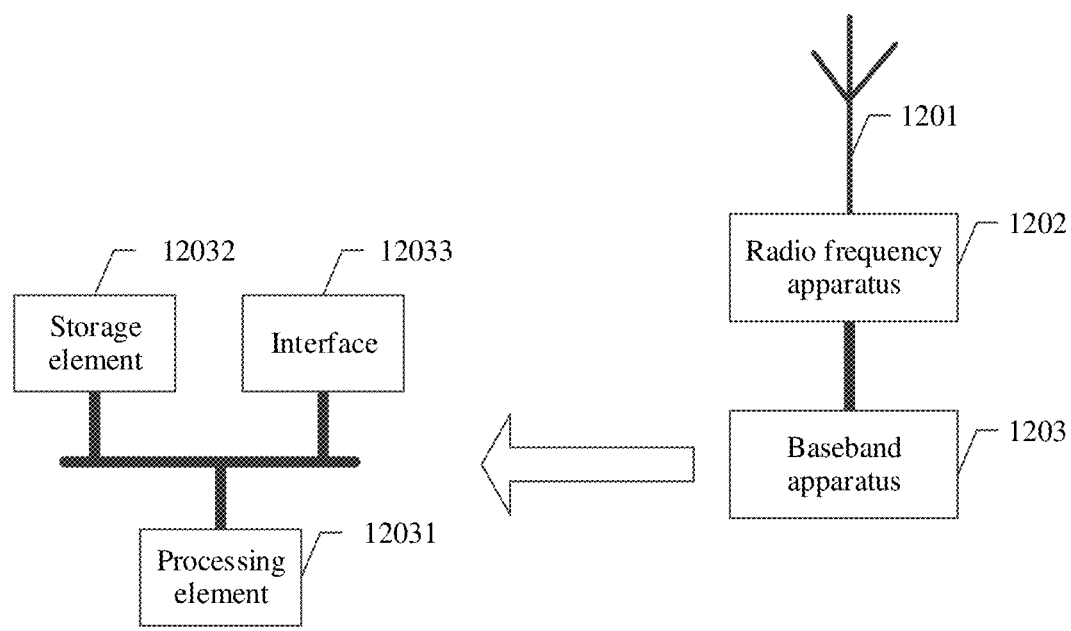
FIG. 12 is a schematic diagram of a structure of a network device in accordance with some embodiments.

FIG. 12 is a schematic diagram of a structure of a network device in accordance with some embodiments. The network device is configured to implement the operations of the network device (for example, the first network device or the second network device) in the foregoing embodiments. As shown in FIG. 12, the network device includes an antenna 1201, a radio frequency apparatus 1202, and a baseband apparatus 1203. The antenna 1201 is connected to the radio frequency apparatus 1202. In an uplink direction, the radio frequency apparatus 1202 receives, by using the antenna 1201, information sent by a terminal device; and sends, to the baseband apparatus 1203 for processing, the information sent by the terminal device. In a downlink direction, the baseband apparatus 1203 processes information from the terminal device and sends processed information to the radio frequency apparatus 1202, and the radio frequency apparatus 1202 processes the information from the terminal device and then sends processed information to the terminal device by using the antenna 1201.

The baseband apparatus 1203 includes one or more processing elements 12031, for example, include one main control CPU and another integrated circuit. In addition, the baseband apparatus 1203 further includes a storage element 12032 and an interface 12033. The storage element 12032 is configured to store a program and data. The interface 12033 is configured to exchange information with the radio frequency apparatus 1202. The interface is, for example, a common public radio interface (CPRI). The foregoing apparatus applied to the network device is located in the baseband apparatus 1203. For example, the foregoing apparatus applied to the network device is a chip in the baseband apparatus 1203. The chip includes at least one processing element and an interface circuit. The processing element is configured to perform steps in any method performed by the network device. The interface circuit is configured to communicate with another apparatus. In some embodiments, units in the network device for implementing the steps in the foregoing methods are implemented in a form of scheduling a program by the processing element. For example, the apparatus used in the network device includes a processing element and a storage element. The processing element invokes a program stored in the storage element, to perform the method performed by the network device in the foregoing method embodiments. The storage element is a storage element on the same chip as the processing element, that is, an on-chip storage element; or is a storage element that is on a different chip from the processing element, that is, an off-chip storage element.

In some embodiments, units of the network device that implement the steps in the foregoing methods are configured as one or more processing elements. The processing elements are disposed in the baseband apparatus. The processing element herein is an integrated circuit, for example, one or more ASICs, one or more DSPs, one or more FPGAs, or a combination of the types of integrated circuits. These integrated circuits are integrated together to form a chip.

The units in the network device for implementing the steps in the foregoing methods are integrated together, and implemented in a form of a system-on-a-chip (SOC). For example, the baseband apparatus includes the SOC chip, and is configured to implement the foregoing methods. At least one processing element and storage element is integrated into the chip, and the processing element invokes a program stored in the storage element to implement the foregoing methods performed by the network device. Alternatively, at least one integrated circuit is integrated into the chip, to implement the foregoing methods performed by the network device. Alternatively, with reference to the foregoing embodiments, functions of some units are implemented by invoking a program by the processing element, and functions of some units are implemented by the integrated circuit.

In some embodiments, the foregoing apparatus used in the network device includes at least one processing element and an interface circuit. The at least one processing element is configured to perform any one of the methods that are provided in the foregoing method embodiments and performed by the network device. The processing element performs, in a first manner, by invoking the program stored in the storage element, some or all steps performed by the network device; or performs, in a second manner, by using a hardware integrated logic circuit in the processor element in combination with instructions, some or all steps performed by the network device; or certainly performs, by combining the first manner and the second manner, some or all steps performed by the network device.

The processing element herein is the same as that described above, and is implemented by using a processor. A function of the processing element is the same as a function of the processing unit described in FIG. 10. For example, the processing element is a general-purpose processor, for example, a CPU, or is one or more integrated circuits configured to implement the foregoing methods, for example, one or more ASICs, one or more microprocessors DSPs, or one or more FPGAs, or a combination of at least two of the integrated circuit forms. The storage element is implemented by using a memory. A function of the storage element is the same as a function of the storage unit described in FIG. 10. A function of the storage element is the same as a function of the storage unit described in FIG. 10. The storage element is one memory, or an umbrella term of a plurality of memories.

The network device shown in FIG. 12 implements the processes related to the network device in the method embodiments shown in FIG. 6, FIG. 8, or FIG. 9. Operations and/or functions of the modules in the network device shown in FIG. 12 are intended to implement the corresponding procedures in the foregoing method embodiments. For details, refer to the descriptions in the foregoing method embodiments. To avoid repetition, detailed descriptions are properly omitted herein.

A person skilled in the art understands that the embodiments are provided as a method, a system, or a computer program product. Therefore, the embodiments are configured to use a form of hardware embodiments, software embodiments, or embodiments with a combination of software and hardware. Moreover, the embodiments are configured to use a form of a computer program product that is implemented on one or more computer-usable storage media (including but not limited to a disk memory, a CD-ROM, an optical memory, and the like) that include computer-usable program code.

Some embodiments are described with reference to flowcharts and/or block diagrams of the method, device (system), and computer program product. In some embodiments, computer program instructions are used to implement each procedure and/or each block in the flowcharts and/or the block diagrams and a combination of procedures and/or blocks in the flowcharts and/or the block diagrams. These computer program instructions are provided for a general-purpose computer, a dedicated computer, an embedded processor, or a processor of another programmable data processing device to generate a machine, so that the instructions executed by a computer or the processor of the another programmable data processing device generate an apparatus for implementing a function in one or more procedures in the flowcharts and/or one or more blocks in the block diagrams.

These computer program instructions alternatively is stored in a computer-readable memory that indicates a computer or another programmable data processing device to work in a manner, so that the instructions stored in the computer-readable memory generate an artifact that includes an instruction apparatus. The instruction apparatus implements a function in one or more procedures in the flowcharts and/or one or more blocks in the block diagrams.

These computer program instructions alternatively is loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

It is clear that a person skilled in the art is able to make various modifications and variations to the embodiments without departing from the scope. In this way, the embodiments are intended to cover these modifications and variations of provided that they fall within the scope of the claims and equivalent technologies thereof.

What is claimed is:

1. A communication method, wherein the method is applied to a terminal device:
   receiving a first synchronization signal broadcast channel block (SSB);
   determining a physical uplink shared channel (PUSCH) occasion corresponding to the first SSB; and
   sending uplink information, through use of the PUSCH occasion;
   determining a correspondence between M SSBs and a plurality of PUSCH occasions, wherein the M SSBs include the first SSB, and M is a positive integer; and
   the determining a PUSCH occasion corresponding to the first SSB comprises:
   determining, based on the correspondence between the M SSBs and the plurality of PUSCH occasions, the PUSCH occasion corresponding to the first SSB.

2. The method according to claim 1, further comprising:
   receiving downlink information from a network device based on a spatial reception parameter of the first SSB.

3. The method according to claim 1, wherein:
   the PUSCH occasion corresponding to the first SSB includes a time domain resource; and
   the determining the correspondence between the M SSBs and the plurality of PUSCH occasions comprises:
   determining the correspondence between the M SSBs and the plurality of PUSCH occasions based on indexes of slots in which the plurality of PUSCH occasions are located; or
   determining the correspondence between the M SSBs and the plurality of PUSCH occasions based on indexes of time domain resources of the plurality of PUSCH occasions and the indexes of slots in which the plurality of PUSCH occasions are located.

4. The method according to claim 3, wherein:
   the PUSCH occasion is associated with a demodulation reference signal (DMRS) resource that includes DMRS port information and/or DMRS sequence information; and
   the determining the correspondence between the M SSBs and the plurality of PUSCH occasions comprises:
   determining the correspondence between the M SSBs and the plurality of PUSCH occasions further based on DMRS resources associated with the plurality of PUSCH occasions.

5. The method according to claim 1, wherein:
   the plurality of PUSCH occasions are in a preset time period.

6. An apparatus, applied for a terminal device, comprises:
   at least one processor; and
   a memory storing instructions for execution by the at least one processor;

wherein, when executed, the instructions cause the at least one processor to perform operations to:
receive a first synchronization signal broadcast channel block (SSB);
determining a physical uplink shared channel (PUSCH) occasion corresponding to the first SSB; and
send uplink information through use of the PUSCH occasion, wherein:
in response to being executed, the instructions cause the at least one processor to perform operations to:
determine a correspondence between M SSBs and a plurality of PUSCH occasions, wherein the M SSBs include the first SSB, and M is a positive integer; and
the determining a PUSCH occasion corresponding to the first SSB comprises:
determine, based on the correspondence between the M SSBs and the plurality of PUSCH occasions, the PUSCH occasion corresponding to the first SSB.

7. The apparatus according to claim 6, wherein:
in response to being executed, the instructions cause the at least one processor to perform operations to:
receive downlink information from a network device based on a spatial reception parameter of the first SSB.

8. The apparatus according to claim 6, wherein:
the PUSCH occasion corresponding to the first SSB includes a time domain resource; and
the determining the correspondence between the M SSBs and the plurality of PUSCH occasions comprises:
determine the correspondence between the M SSBs and the plurality of PUSCH occasions based on indexes of slots in which the plurality of PUSCH occasions are located; or
determine the correspondence between the M SSBs and the plurality of PUSCH occasions based on indexes of time domain resources of the plurality of PUSCH occasions and the indexes of slots in which the plurality of PUSCH occasions are located.

9. The apparatus according to claim 8, wherein:
the PUSCH occasion is associated with a demodulation reference signal (DMRS) resource that includes DMRS port information or DMRS sequence information; and
the determining the correspondence between the M SSBs and the plurality of PUSCH occasions comprises:
determining the correspondence between the M SSBs and the plurality of PUSCH occasions further based on DMRS resources associated with the plurality of PUSCH occasions.

10. The apparatus according to claim 6, wherein:
the plurality of PUSCH occasions are in a preset time period.

11. A non-transitory memory storage medium, comprising:
computer-executable instructions that, when executed, facilitate a terminal device carrying out operations to:
receive a first synchronization signal broadcast channel block (SSB);
determine a physical uplink shared channel (PUSCH) occasion corresponding to the first SSB; and
send uplink information through use of the PUSCH occasion, wherein:
in response to the instructions being executed, carrying out operations to:
determine a correspondence between M SSBs and a plurality of PUSCH occasions, wherein the M SSBs includes the first SSB, and M is a positive integer; and
the determining the PUSCH occasion corresponding to the first SSB comprises:
determine, based on the correspondence between the M SSBs and the plurality of PUSCH occasions, the PUSCH occasion corresponding to the first SSB.

12. The non-transitory memory storage medium according to claim 11, wherein:
in response to the instructions being executed, carrying out operations to:
receive downlink information from a network device based on a spatial reception parameter of the first SSB.

13. The non-transitory memory storage medium according to claim 11, wherein:
the PUSCH occasion corresponding to the first SSB includes a time domain resource; and
the determining the correspondence between the M SSBs and the plurality of PUSCH occasions comprises:
determine the correspondence between the M SSBs and the plurality of PUSCH occasions based on indexes of slots in which the plurality of PUSCH occasions are located; or
determine the correspondence between the M SSBs and the plurality of PUSCH occasions based on indexes of time domain resources of the plurality of PUSCH occasions and the indexes of slots in which the plurality of PUSCH occasions are located.

14. The non-transitory memory storage medium according to claim 13, wherein:
the PUSCH occasion is associated with a demodulation reference signal (DMRS) resource that includes DMRS port information and/or DMRS sequence information; and
the determining the correspondence between the M SSBs and the plurality of PUSCH occasions comprises:
determine the correspondence between the M SSBs and the plurality of PUSCH occasions further based on DMRS resources associated with the plurality of PUSCH occasions.

15. The non-transitory memory storage medium according to claim 11, wherein:
the plurality of PUSCH occasions are in a preset time period.

* * * * *